(12) United States Patent
Shulman

(10) Patent No.: US 7,584,530 B2
(45) Date of Patent: Sep. 8, 2009

(54) METHOD AND APPARATUS FOR COMPRESSING SCRAP METAL STRIP

(76) Inventor: Alvin D. Shulman, 1009 Carlyle Ter., Highland Park, IL (US) 60035

( * ) Notice: Subject to any disclaimer, the term of this patent is extended or adjusted under 35 U.S.C. 154(b) by 690 days.

(21) Appl. No.: 11/034,405

(22) Filed: Jan. 12, 2005

(65) Prior Publication Data

US 2006/0150383 A1  Jul. 13, 2006

(51) Int. Cl.
  *B23P 17/00* (2006.01)
  *B02C 23/08* (2006.01)
(52) U.S. Cl. .................. 29/403.1; 29/403.2; 29/403.3; 241/3; 241/68; 100/39; 100/95; 100/97
(58) Field of Classification Search ............... 29/403.1, 29/403.2, 403.3; 241/3, 24.1, 24.12, 24.13, 241/24.25, 25, 68, 101.01; 100/39, 95, 96, 100/97; 83/694
  See application file for complete search history.

(56) References Cited

U.S. PATENT DOCUMENTS

| | | | |
|---|---|---|---|
| 2,133,939 A | | 10/1938 | Maroney et al. |
| 2,234,127 A | | 3/1941 | Mautsh |
| 3,155,028 A | * | 11/1964 | Morgenson ................ 100/96 |
| 3,249,039 A | * | 5/1966 | Jonghe ........................ 100/96 |
| 3,653,878 A | | 4/1972 | Yo |
| 4,067,096 A | * | 1/1978 | Whalen, Jr. ................ 29/403.2 |
| 4,176,438 A | * | 12/1979 | Warden ....................... 29/403.1 |
| 4,253,388 A | | 3/1981 | Vezzani |
| 4,335,494 A | | 6/1982 | Lemelson et al. |
| 4,552,062 A | | 11/1985 | Vezzani |
| 4,660,469 A | | 4/1987 | Smith et al. |
| 4,739,641 A | | 4/1988 | Hering et al. |
| 5,033,374 A | | 7/1991 | Vezzani |
| 5,697,243 A | | 12/1997 | Ueda et al. |
| 6,612,421 B1 | | 9/2003 | Kohl et al. |
| 6,729,229 B1 | | 5/2004 | Wildes et al. |

FOREIGN PATENT DOCUMENTS

| | | |
|---|---|---|
| EP | 228 008 A | 7/1987 |
| JP | 59039496 A | 3/1984 |
| SE | 516 899 C2 | 3/2002 |

OTHER PUBLICATIONS

Nijkerk, A.A., Dalmijn, W.L.: "Handbook of Reycling Techniques", 1998, pp. 1, 2, 77, Nijkerk Consultancy, The Hague.
Patent Abstracts of Japan, vol. 008, No. 140 (M-305).

(Continued)

*Primary Examiner*—Jermie E Cozart
(74) *Attorney, Agent, or Firm*—Marshall, Gerstein & Borun LLP

(57) ABSTRACT

A stream of scrap metal strip is continuously compressed in an apparatus comprising a pair of compression rolls and a traveling shear disposed, in that sequence, along a processing path having a substantial vertical component. The process is performed continuously, and there is no need for the process to be interrupted in order to remove strip parts overhanging the entrance to the compression apparatus.

32 Claims, 14 Drawing Sheets

OTHER PUBLICATIONS

International Search Report, dated Jul. 7, 2006, in corresponding international application No. PCT/US2005/047108.

Nijkerk, A.A. and W. L. Dalmijn, "Handbook of Recycling Techniques", 1998, pp. 48-163 (not all inclusive), *Nijkerk Consultancy, The Hague*, Netherlands.

The Yellow Equipment You Can Trust; The New Cayman 777 horizontal shear, Colmar USA, Wheatfield, NY (undated), pp. 1, 3.

Horitzontal Scrap Shear, Moros H-G-700 "Piraña", Industrias Hidraulicas S.A., Zaragoza, Spain (undated), pp. 1, 2.

Scrap Baling Press Model "GC-S", Moros/North America, Louisville, KY, (undated), pp. 1-3.

Lindemann RAS Scrap Baling Presses, Metso Minerals North and Central America, Milwaukee, WI (2000), pp. 4, 5.

Colmar—Horizontal Shears Cayman Series, Oct. 2005, Colmar USA, Inc., Wheatfield, N.Y., U.S.A.

International Preliminary Report on Patentability issued Mar. 23, 2007, for counterpart international (PCT) application No. PCT/US2005/047108.

\* cited by examiner

METHOD AND APPARATUS FOR COMPRESSING SCRAP METAL STRIP

BACKGROUND OF THE INVENTION

The present invention relates generally to equipment for processing scrap metal, and more particularly to equipment for compressing scrap metal strip into a more densified form.

Scrap metal strip is a residual by-product of manufacturing operations in which, typically, a coil of metal strip (e.g., a coil of steel strip) is subjected to a series of processing steps which may include slitting the edges of the strip and stamping pieces from the strip. The resulting residue includes a multiplicity of pieces having different contours and sizes: long pieces, both tangled and untangled; shorter pieces; skeletal pieces; sheet-like pieces; and rejected or defective stamped pieces.

Almost all scrap metal strip from manufacturing operations is recycled as part of the raw material to make new metal. In the case of scrap steel strip, it is part of the raw material charged into steel-making furnaces, of which there are two main types: the electric arc furnace in which most or all of the charge is steel scrap; and the basic oxygen furnace in which steel scrap is generally about 25-30% of the charge.

Scrap metal strip is typically light gauge (i.e., thin), and a given volume of uncompressed scrap metal strip has a relatively low density, too low to be a desirable part of the charge for a metal-making melting furnace, which requires a more compact, more densified charge. The percentage of recovery of new metal from scrap, when the scrap is melted in a metal-making furnace, depends in part on the compactness and density of the scrap metal in the charge.

To overcome the deficiency described in the preceding paragraph, scrap metal strip is typically compressed into bales which are compact, densified cubes of material. In the case of scrap steel strip, a bale thereof can have cross-sectional dimensions of 40×40 cm (16×16 in.) and a length of 60 cm (24 in.). Bales of other light gauge steel scrap can have cross-sectional dimensions of up to 60×60 cm (24×24 in.) and a length up to 150 cm (60 in.).

In addition to improving the recovery percentage of the scrap metal strip when it is melted, the bales facilitate the handling, storage and transportation of the scrap metal strip.

The current commercial process employed to compress scrap metal strip into bales is a batch operation in which a discrete volume of scrap is processed into a bale, after which a second discrete volume is subjected to the same processing operation in the same apparatus. The processing of the second volume cannot begin until the processing of the first volume has been completed (a delay, typically, of one minute or more). A more detailed description of the batch baling operation and apparatus is set forth below.

A discrete volume of scrap metal strip is loaded into a charging box which is then tipped to discharge its load into an opening in the top of an elongated, horizontally disposed compression chamber. The charging box is then returned to its loading position to receive another discrete volume of scrap, and the opening in the top of the compression chamber is closed with a hinged, hydraulically powered lid or cover which exerts a relatively small amount of vertical compression on the low density volume of scrap in the compression chamber. The scrap is then compressed, typically in two horizontal directions, each transverse to the other, by a pair of hydraulic rams movable between retracted and extended positions. One ram is extended to compress the scrap in a lateral, horizontal direction in the elongated compression chamber, and the other ram is extended to compress the scrap in a longitudinal, horizontal direction. The resulting bale is ejected from the compression chamber, the rams are retracted, the cover on the compression chamber is opened and the above-described sequence of processing steps is repeated on a new, discrete volume of scrap metal strip.

A problem can arise when a load of scrap metal strip is discharged from the charging box into the compression chamber. The load can contain long pieces of strip, parts of which can extend outside the top opening of the compression chamber and hang out over the edge of that opening. Before one can close the hinged lid for that opening, the overhanging strip parts (i.e., the excess scrap metal strip) have to be manually cut off i.e., trimmed, typically with an acetylene torch, or other device, wielded by a member of the crew that operates the baling apparatus. This interrupts and delays the sequence of processing steps and incurs an expenditure of non-productive time, effort and money.

Because of the problem described in the preceding paragraph, and because of the employment of a batch process with its inherent limitations on productivity, the current commercial operation for compressing scrap metal strip into bales is relatively inefficient. A continuous process for compressing scrap metal strip would be desirable.

The scrap metal strip discussed above is, as previously noted, a residual by-product of manufacturing operations performed on coils of new metal, e.g., coils of new steel strip. Scrap generated as a residual by-product of manufacturing operations is known as "industrial scrap". Another type of scrap, called "obsolete scrap," is composed of discarded articles made of metal. Light gauge, obsolete steel scrap and some heavier obsolete steel scrap are subjected to continuous processing in an apparatus known as a "shredder".

In a shredder, the steel scrap is flailed, by rotating, free-swinging hammers, into relatively small, fist-sized pieces that provide a compact, densified charge in a melting furnace. Obsolete steel scrap is continuously fed into a shredder along a downwardly inclined path on which is located compacting equipment which can be a pair of compression rolls or a continuous, tread-like member having a portion converging toward the path in a downstream direction. The compacting equipment reduces the volume of the obsolete scrap before the scrap enters the shredder. Shredding is essentially a continuous process.

Earlier versions of the shredder dropped whole, obsolete autos, in free fall, along a vertical path onto the rotating hammers of the shredder.

A scrap-processing apparatus known as a "logger/shear" has an elongated, horizontally disposed chamber into which is loaded obsolete steel scrap which is then compacted vertically and laterally by hydraulically powered compacting elements to form an elongated cube, or log. The log is pushed downstream through the chamber, by a hydraulic ram, toward a stationary guillotine shear which cuts the log into smaller pieces. The shear comprises a hydraulically powered upper shear blade which is raised to allow a portion of the log to be pushed downstream of the shear blade following which the blade is lowered to sever that portion from the log. The logger/shear, like the baler, processes one batch of scrap at a time.

There are steel rolling mills that produce an elongated steel product which moves in a continuous stream along a horizontal path where the elongated product is cut into shorter lengths by a traveling or flying shear. The shear is mounted in a movable housing that moves in the same direction and at the same speed as the steel product during the shearing operation. After each cut, the housing moves back to its original position in preparation for the next cut.

Balers, shredders, loggers and shears are described in detail in the following publication: Nijkerk, A. A. and Dalmijn, W. L., Handbook of Recycling Techniques, Nijkerk Consultancy, The Hague, Netherlands, 1998. This publication will hereinafter be referred to an "Nijkerk." Relevant parts of Nijkerk, designated herein below, are incorporated herein by reference.

SUMMARY OF THE INVENTION

The drawbacks and deficiencies of the baling operation described above are eliminated by the present invention, some embodiments of which provide an apparatus and method for continuously compressing scrap metal strip. A preferred embodiment of the apparatus comprises a pair of compression rolls and a traveling shear arranged, in that sequence, along an essentially vertical processing path having an upstream end. A volume of scrap metal strip is received at the upstream end and moves downstream along the processing path, preferably as a continuous stream, under the urging of gravity. The stream is compressed into a continuous slab of compressed strip by the compression rolls which move or feed the continuous slab downstream toward the traveling shear which cuts the continuous slab into slab portions each composed of compressed scrap metal strip.

The introduction of the scrap metal strip into the apparatus, the compression step and the shearing step are all performed without interrupting the downstream movement of the stream and the slab along the processing path.

The processing path includes a vertically disposed chamber having an opening at the upstream end of the processing path and through which the continuous stream of scrap metal strip is introduced. Because of the manner in which the apparatus is constructed and the manner in which the process is performed, it should be unnecessary to interrupt the processing operation to remove overhanging strip parts at the chamber's opening. This will be discussed in more detail below.

Other features and advantages are inherent in the method and apparatus described and claimed or will become apparent to those skilled in the art from the following detailed description in conjunction with the accompanying diagrammatic drawings.

BRIEF DESCRIPTION OF THE DRAWINGS

FIG. 2 is a sectional view taken along line 2-2 in FIG. 1a;

FIG. 3 is a sectional view taken along line 3-3 in FIG. 1a;

FIG. 5 is an enlarged, fragmentary sectional view showing part of the structure illustrated in FIG. 1a;

FIG. 6 is an enlarged, fragmentary view showing another part of the structure illustrated in FIG. 1a;

FIG. 32 is a fragmentary side view, partially in section, illustrating a variation of the embodiment shown in FIG. 1a;

DETAILED DESCRIPTION

Figure 1A:
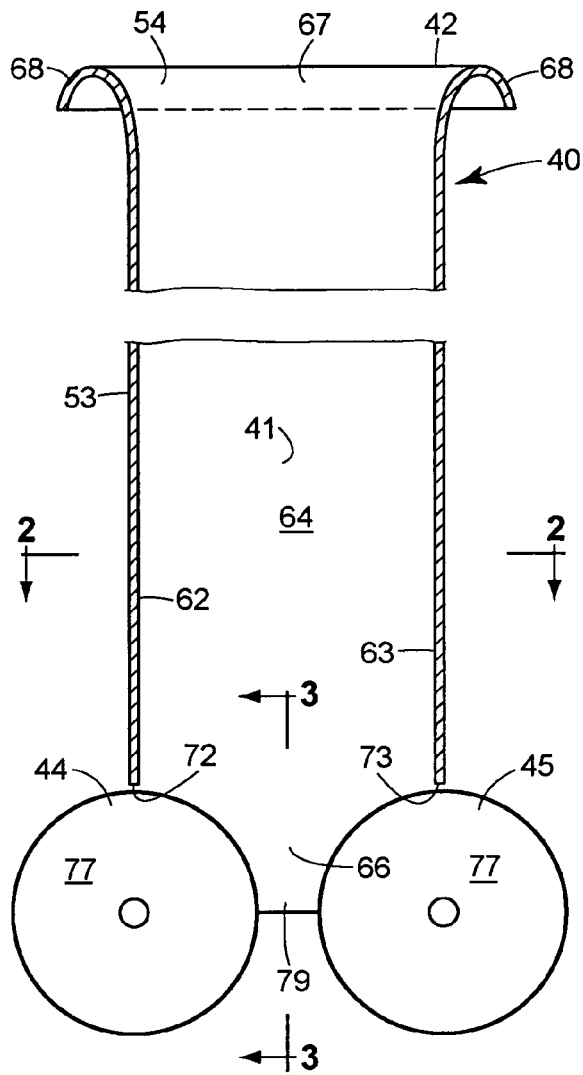
FIGS. 1a and 1b are fragmentary side views, partially in section, showing portions of an embodiment of an apparatus in accordance with the present invention.
Figure 1B:
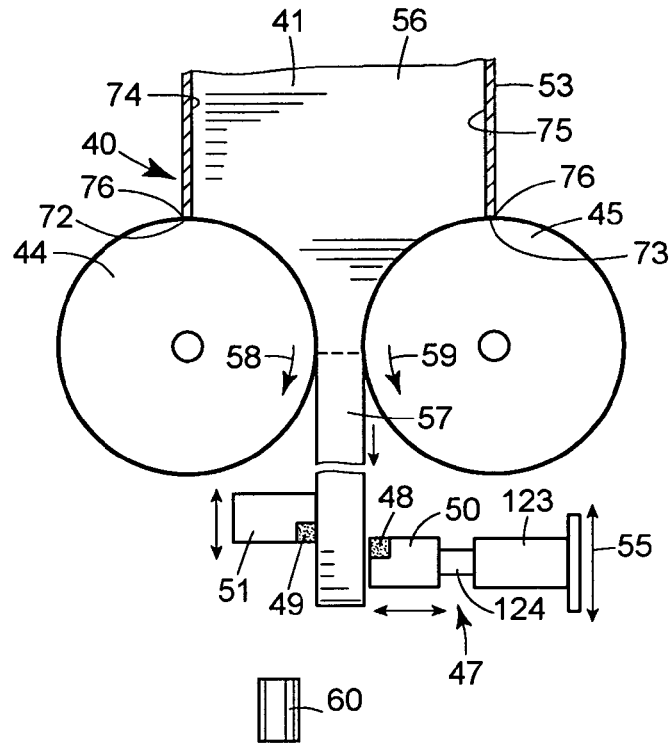

Referring initially to FIGS. 1a and 1b, indicated generally at 40 is an apparatus for compressing scrap metal strip, in accordance with an embodiment of the present invention. Apparatus 40 comprises a processing path 41 having an upstream end 42 and, in the embodiment of FIGS. 1a and 1b, a vertical disposition. Located along path 41, downstream of the path's upstream end 42, are a pair of compression rolls 44, 45. Located downstream of the compression rolls, along processing path 41, is a traveling guillotine shear indicated generally at 47 in FIG. 1b. Shear 47 includes two shear blades 48, 49 and corresponding blade holders 50, 51, all of which are shown here representationally, as in Nijkerk (p. 48, FIG. V-6-16a and p. 49, FIG. V-6-16b).

That portion of processing path 41 upstream of compression rolls 44, 45 is defined by a charging or receiving chamber 53 having an open upper end or entrance 54 at the path's upstream end 42. Scrap metal strip is introduced through open upper end 54 into chamber 53. The construction and disposition of chamber 53 enables scrap metal strip received within chamber 53 to move downstream along path 41, as a continuous stream 56 (FIG. 1b), under the urging of gravity, and toward compression rolls 44, 45.

Referring to FIG. 1b, compression rolls 44, 45 are rotated to compress between them the scrap metal strip in stream 56 and form a continuous slab 57 composed of compressed scrap metal strip. The compressing step is performed by rolls 44, 45 without interrupting the downstream movement of continuous stream 56 along processing path 41. Compression rolls 44, 45 may be provided with studs or projections to facilitate engagement with the stream of scrap metal strip (see Nijkerk, p. 94, FIG. V-11-3; p 98, FIG. V-11-5; and p. 106, FIG. V-11-9b).

Rolls 44, 45 rotate in a downstream direction (arrows 58, 59) as the rolls form slab 57. This urges slab 57 to move downstream toward traveling shear 47 which cuts slab 57 into a plurality of slab portions 60 each composed of compressed scrap metal strip. Shear 47 is mounted for reciprocating movement alongside of and at the same speed as slab 57. Shear 47 moves initially downstream and then upstream, as indicated by arrow 55, and this enables the shear to perform the cutting step without interrupting the downstream movement of slab 57.

As shown in FIG. 1b, the continuous stream 56 of scrap metal strip forms a vertical column in charging chamber 53. In accordance with the present invention, the vertical column of scrap metal strip has a depth and a mass sufficient to exert a substantial vertical compressive force on that part of stream 56 immediately above compression rolls 44, 45 and thereby substantially flatten the scrap metal strip there. There will be at least some flattening of the strip at almost every level in the column downstream of the top of the column. The extent to which the strip is flattened at a given level in the column depends upon the depth and mass of the column above that level. The greater the depth of the column above the strip at a given level, the more the strip at that level is flattened by the column above it. For example, in a column 20-25 ft. high (600-750 cm) there will be more flattening at the bottom of that column than in a column 10 ft. (300 cm) high.

Figure 4:
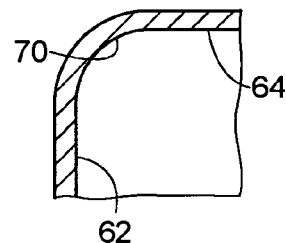
FIG. 4 is an enlarged, fragmentary sectional view showing part of the structure illustrated in FIG. 2.
Figure 2:
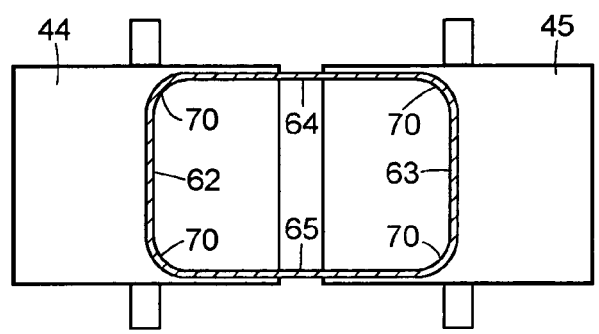

Referring now to FIGS. 1a, 2 and 4, chamber 53 has a plurality of vertical walls 62-65 joined together at concavely curved junctions 70, 70 (FIGS. 2 and 4) to minimize the possibility of a hang-up on the part of stream 56 as the stream descends through chamber 53. If vertical chamber walls 62-65 were joined at sharp corners instead of at curved junctions 70, 70, the possibility of a hang-up would be increased.

Figure 5:
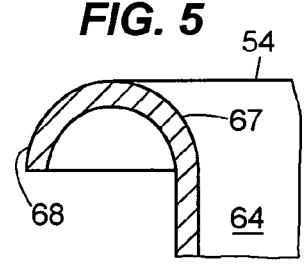

As shown in FIGS. 1a and 5, open upper end 54 on chamber 53 is defined by a plurality of connected wall portions 67, 67 each of which flares outwardly along a convex curve and terminates in a downwardly depending flange 68. This arrangement minimizes the possibility of a hang-up on the part of the scrap metal strip as the strip is received through open upper end 54. If the chamber's open upper end 54 were defined by the terminal upper edges of vertical walls instead of by convexly curved wall portions terminating at downwardly depending flanges, the possibility of a hang-up at open upper end 54 would be increased.

Referring to FIGS. 1a and 1b, chamber walls 62, 63 each terminate at a respective lower edge 72, 73 located slightly above the surface of a respective compression roll 44, 45 to provide clearance for the roll to rotate. As shown in FIG. 1b, each lower edge 72, 73 is disposed at a location slightly inward of the highest point 76 on the surface of a corresponding roll so as to direct scrap metal strip at the outer margins 74, 75 of stream 56 toward that part of a roll surface that is curved inwardly and downwardly.

Each roll 44, 45 has a pair of opposite ends 77, 78 (FIG. 3), and each vertical chamber wall 64, 65 is spaced inwardly relative to a respective roll end 77, 78 to contain stream 56 inwardly of the roll ends. Each chamber wall 64, 65 has a lower depending portion 66 (FIGS. 1a, 3 and 6) which is disposed between rolls 44, 45. Each depending portion 66 has a pair of side edges 80, 81 (FIG. 3) each of which follows the contour of a respective roll 44, 45 and is spaced a slight distance from the surface of the adjacent roll to provide a clearance for rotation of the roll. Each depending wall portion 66 terminates at a lower edge 79 disposed at the narrowest gap between rolls 44, 45, adjacent a respective pair of corresponding roll ends 77, 77 (FIG. 3) or 78, 78. The depending portions 66, 66 act to contain the strip in stream 56 from spilling out at the ends of the rolls when the stream undergoes compression in a horizontal direction between the rolls. More particularly, the depending portions prevent spill-out in a horizontal direction transverse to the horizontal direction of compression.

As noted above, the scrap metal strip moves as a continuous stream 56 downstream along a vertically disposed path 41 toward a compression location at rolls 44, 45. The compression location is relatively remote from the upstream open end 54 through which strip is introduced. This should minimize, if not eliminate, the problems associated with overhanging strip parts (i.e., the excess scrap metal strip), problems which occur at the opening to the horizontally disposed chamber of a batch baling apparatus when a discrete volume of scrap metal strip is deposited there.

More particularly, to the extent that a strip part may occasionally initially overhang upstream open end 54, this strip part is typically connected to another strip part that is inside chamber 53. It is projected that the overhanging strip part will be pulled through open end 54 and into chamber 53 by the strip part that is inside chamber 53 and to which the overhanging strip part is connected. The inside strip part descends along vertical processing path 41, with the rest of continuous stream 56, under the urging of gravity and under the further downward urging, from above, by those portions of continuous stream 56 which are subsequently introduced on top of the aforementioned inside strip part. The aforementioned inside strip part may also be entangled with other strips in the descending stream inside chamber 53, and this further assists in the downward pull on the overhanging strip part. An overhanging strip part pulled into the chamber in this manner should then merge into continuous stream 56 with subsequently introduced portions of the stream.

Even if an overhanging strip part remains at upstream open end 54 of chamber 53, the overhanging strip part should not interfere with the downstream processing operations because upstream open end 54 is relatively remote from the downstream locations where the compressing and shearing operations are performed. It should be unnecessary to interrupt either (a) introduction of scrap metal strip through entrance 54 or (b) any other processing of the strip in order to remove any overhanging strip parts which remain at the upstream open end. Removal of such strip parts can be deferred until apparatus 40 is shut down at the end of a work shift, or the like.

Referring again to FIGS. 1a and 1b, chamber 53, as noted above, is vertically disposed, and it has a uniform cross-section along substantially the totality of its vertical dimension upstream from compression rolls 44, 45. The stream 56 of scrap metal strip has a continuous succession of adjacent, horizontally disposed stream parts extending upstream from the compression rolls. Each of these horizontally disposed stream parts has a uniform cross-section because the cross-section of each such stream part is defined by the cross-section of chamber 53 which, as noted above, is uniform along substantially its entire vertical dimension. The net result of all this is that, as stream 56 moves downstream toward compression rolls 44, 45, the compression rolls are presented with a succession of adjacent stream parts each having the same cross-section, and this enhances the uniformity of continuous slab 57 produced by compression rolls 44, 45.

Figure 9:
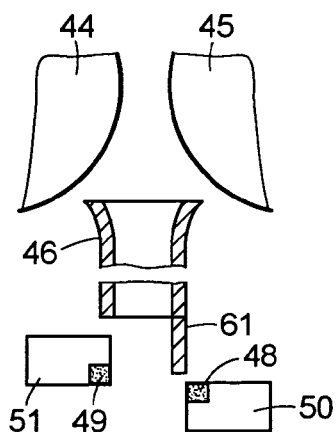
FIG. 9 is an enlarged, fragmentary side view, partially in section, showing a variation of the embodiment of FIG. 1b.
Figure 10:
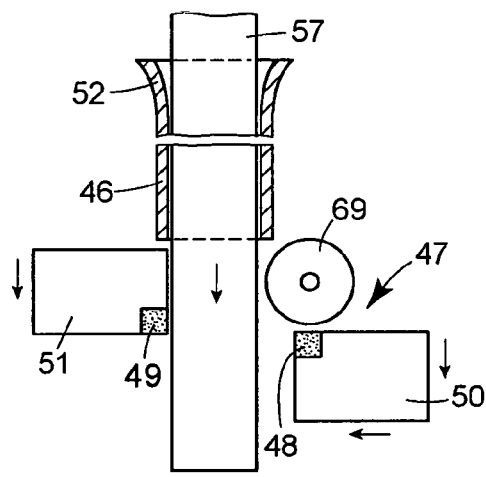
FIGS. 10-12 are enlarged, fragmentary side views, partially in section, illustrating another variation of the embodiment of FIG. 1b, in operation.
Figure 13:
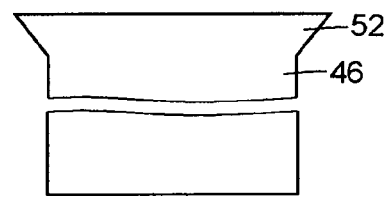
FIG. 13 is a fragmentary front view of a component of the apparatus illustrated in section in FIG. 10.

Referring to FIGS. 9, 10 and 13, disposed along the processing path between compression rolls 44, 45 and traveling shear 47 is a guide chute 46 having an upper portion 52 that flares outwardly to receive slab 57 as the slab descends downstream from rolls 44, 45. Guide chute 46 directs slab 57 toward shear 47. In the embodiment of FIG. 9, chute 46 has a depending flange 61 to help contain the slab as it moves downstream toward shear blade 48 and its holder 50. In the embodiment of FIG. 10, there is a freely rotating roller 69 which contains slab 57 as the slab moves downstream from chute 46. Roller 69 travels with shear 47.

Figure 11:
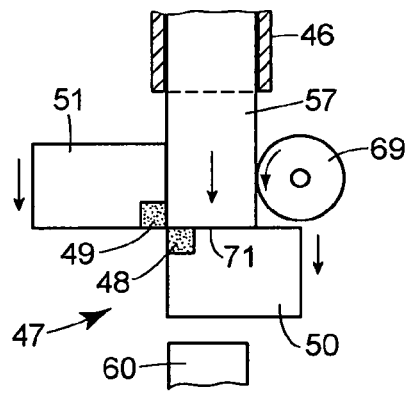
Figure 12:
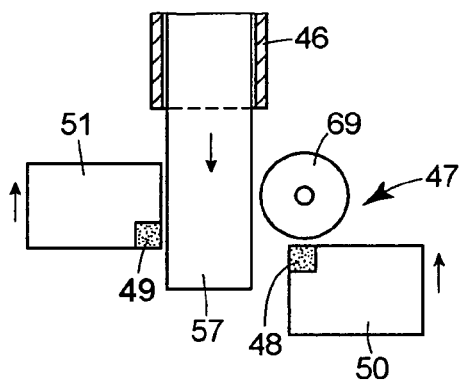

Referring to FIGS. 10-12, traveling shear 47 includes an active shear blade 48 and a passive shear blade 49. Active shear blade 48 and its holder 50 are mounted for reciprocal movement in a horizontal or first direction between a retracted position shown in FIG. 10 and an extended position shown in FIG. 11. As shear blade 48 moves from its retracted position to its extended position, slab 57 is engaged between the two shear blades 48, 49, and a slab portion 60 is severed from slab 57.

Both shear blades 48, 49 and their respective holders 50, 51 are mounted for reciprocal movement together along the processing path, in a vertical or second direction, transverse to the first or horizontal cutting direction of the shear blades. Vertical movement of the shear blades occurs between an upper first position (FIG. 10) and a lower second position (FIG. 12). Downstream movement of shear blades 48, 49 is synchronized with the downstream movement of slab 57 (FIG. 11) so that all of them move at the same speed downstream. As a result, the locus 71 of engagement between (a) slab 57 and (b) shear blades 48, 49 remains the same during all the movement described above.

After the shear blades sever slab portion 60 from slab 57 (FIG. 11), active shear blade 48 and its holder 50 are returned from the extended position of FIG. 11 to the retracted position of FIG. 10. During the retraction of active shear blade 48, both shear blades and their holders continue to move vertically downward (i.e., downstream) until active shear blade 48 has been retracted to a slab-clearing position (FIG. 12). In this position, blade 48 no longer protrudes into the path of slab 57 which has continued to move downstream along the processing path while the shear blades have been undergoing the movement illustrated in FIGS. 10-12 and described above.

After active shear blade 48 has been retracted to the slab-clearing position shown in FIG. 12, both shear blades 48, 49 and their respective holders 50, 51 are returned vertically upwardly (upstream) to the upper first position shown in FIG. 10.

At start-up, chamber 53 is charged with scrap metal strip until the chamber contains a substantial amount of material, e.g., at least 25% full, preferably 50-75% full (or more in some cases). Compression rolls 44, 45 are inactive during the initial charging period at start-up. Active shear blade 48 and its holder 50 may be manually controlled to locate them in their extended positions (FIG. 11) where they form a barrier to prevent scrap metal strip, which may have fallen through the gap between inactive rolls 44, 45, from descending further. When rolls 44, 45 are activated to perform their compression function, shear blade 48 and its holder 50 can be manually controlled to return them to their retracted positions (FIG. 10), and they then function in accordance with their normal operation (FIGS. 10-12).

Up to this stage of the process, apparatus 40 has functioned, in effect, as a continuous logger/shear, and slab portion 60 may be utilized in a manner similar to the uses to which scrap metal processors put logs made by a conventional logger/shear. Alternatively, slab portion 60 may be subjected to further processing in accordance with the present invention, as described below.

Figure 14:
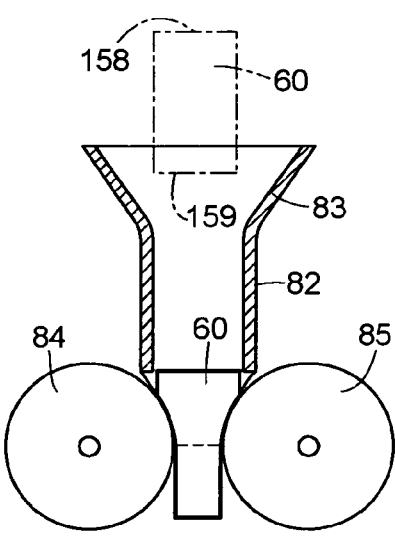
FIG. 14 is a side view, partially in section, illustrating a portion of the apparatus downstream of those portions shown in FIGS. 1b and 10-12.
Figure 15:
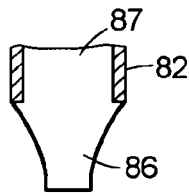
FIG. 15 is a fragmentary side sectional view showing a component of the apparatus portion illustrated in FIG. 14.
Figure 16:
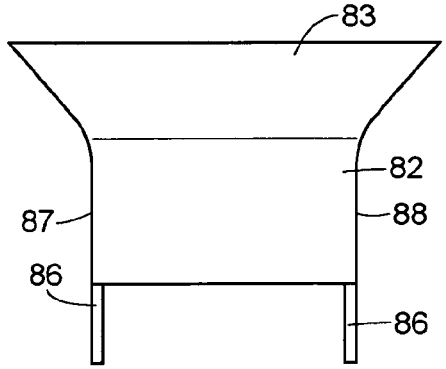
FIG. 16 is a front view of the whole of the component shown in FIG. 15.

FIGS. 14-16 illustrate an embodiment of the invention in which slab portion 60 is subjected to additional compression after the slab portion is severed from slab 57 (FIG. 11).

Located downstream of traveling shear 47, below the shear, are a second pair of compression rolls 84, 85. Located between traveling shear 47 and the second pair of compression rolls 84, 85 is a guide chute 82 having an outwardly flared upper portion 83 for directing a slab portion 60 into chute 82 which in turn directs slab portion 60 downwardly between compression rolls 84, 85 under the urging of gravity. Rolls 84, 85 further compress the scrap metal strip in slab portion 60 to increase the density of the slab portion. The second pair of compression rolls 84, 85 are axially disposed to compress the scrap metal strip in the same horizontal direction as the compression direction at the first pair of compression rolls 44, 45 (see FIG. 1b).

Guide chute 82 has a pair of opposite ends 87, 88 (FIG. 16) from each of which depends a lower containment portion 86 having opposite edges curved to follow the contours of rolls 84, 85 between which each containment portion 86 is disposed. Containment portions 86, 86 perform the same containment function at rolls 84, 85 as that performed at rolls 44, 45 by containment portions 66, 66 on chamber 53 (see FIGS. 1a, 1b, 3 and 6).

As noted above, compression rolls 84, 85, located downstream of traveling shear 47, are axially disposed to compress the scrap metal strip in slab portion 60 in the same horizontal direction as the compression direction at compression rolls 44, 45 located upstream of traveling shear 47. In a variation of this embodiment, the compression rolls located downstream of the traveling shear are axially disposed to compress the scrap metal strip in a horizontal direction transverse to the compression direction at compression rolls 44, 45 located upstream of the traveling shear.

In another variation of the embodiment of FIG. 14, there are two pairs of compression rolls located downstream of traveling shear 47, with one of the two downstream pairs being located downstream of the other pair. Each pair of downstream compression rolls is axially disposed transversely to the other pair. One pair of downstream compression rolls compresses the scrap metal strip in the same horizontal direction as the compression direction at upstream compression rolls 44, 45, and the other pair of downstream compression rolls compresses the scrap metal strip in a horizontal direction transverse to the compression direction at upstream compression rolls 44, 45.

An arrangement employing two pairs of compression rolls, with each pair axially disposed transversely to the other pair, is illustrated and discussed, in another context, below in connection with FIGS. 27-28.

Figure 7:
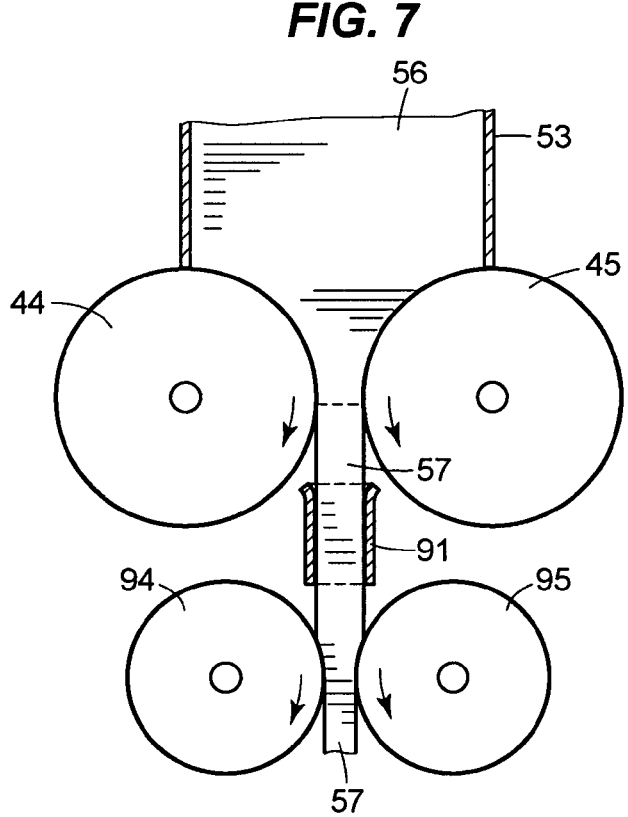
FIG. 7 is a view similar to FIG. 1b showing a portion of another embodiment of the present invention.
Figure 8:
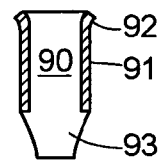
FIG. 8 is a side sectional view showing a component of the embodiment of FIG. 7.

FIGS. 7-8 illustrate an embodiment of the present invention wherein slab 57 is subjected to further compression upstream of traveling shear 47.

Located downstream of compression rolls 44, 45, along the processing path, are an additional pair of compression rolls 94, 95. As noted above, as continuous slab 57 leaves upstream compression rolls 44, 45, the slab is moved or urged downstream by the rotation of upstream compression rolls 44, 45. Located between downstream compression rolls 94, 95 and upstream compression rolls 44, 45 is a guide chute 91 having an outwardly flared upper portion 92 for directing continuous slab 57 into chute 91 which in turn directs slab 57 downwardly between compression rolls 94, 95. Rolls 94, 95 further compress the scrap metal strip in slab 57 to increase the density of the slab. Rolls 94, 95 are axially disposed to compress the scrap metal strip in the same horizontal direction as the compression direction at the upstream pair of compression rolls 44, 45.

Guide chute 91, like guide chute 82 (FIGS. 14-16) has a pair of opposite ends, only one of which is shown, at 90 in FIG. 8. Depending from each chute end (e.g. 90) is a lower containment portion 93 (shown in FIG. 8, only). Each containment portion 93 has opposed edges curved to follow the contours of rolls 94, 95 between which each containment portion 93 is disposed. Each containment portion 93, depending from chute 91, performs the same containment function at rolls 94, 95 as that performed at rolls 84, 85 by containment portions 86, 86 depending from chute 82 (see FIGS. 14-16).

As noted above, compression rolls 94, 95, located downstream of compression rolls 44, 45, are axially disposed to compress the scrap metal strip in slab 57 in the same horizontal direction as the compression direction at upstream compression rolls 44, 45. In a variation of this embodiment, the downstream compression rolls 94, 95 may be axially disposed to compress the scrap metal strip in a horizontal direction transverse to the compression direction at upstream compression rolls 44, 45. As noted above, an arrangement employing two pairs of compression rolls, with each pair axially disposed transversely to the other pair, is illustrated and discussed, in another context, below in connection with FIGS. 27-28.

After slab 57 is further compressed at compression rolls 94, 95, the slab leaves the rolls and is urged downstream by the rotation of compression rolls 94, 95. The downstream moving slab is then directed toward traveling shear 47 by a guide chute similar to that shown at 46 in FIGS. 9, 10 and 13.

In the embodiment of FIG. 7, slab 57 undergoes compression at two pairs of compression rolls (44, 45 and 94, 95) before the slab is sheared. Slab 57, in the embodiment of FIG. 7, is denser at the time the slab undergoes shearing than is slab 57 in the embodiment of FIG. 1b wherein the slab undergoes compression at only one pair of compression rolls (44, 45) before the slab is sheared. The greater the density of the slab, the more powerful the shearing force required to cut the slab into slab portions 60 (FIGS. 1b and 11). An advantage resides in the embodiment of FIG. 14, where the second compression occurs after slab portion 60 has been severed from slab 57. Compared to the slab of FIG. 7, the slab of FIG. 14 is less dense at the time it undergoes shearing so that a less powerful shearing force (i.e., a smaller, less expensive shear 47) is required.

As noted above, horizontally disposed, traveling shear 47 is a guillotine shear. Examples of vertically disposed guillotine shears are shown and described in Nijkerk at pp. 53-64, (although none are traveling shears). Note, for example the vertical guillotine shears shown in Nijkerk at p. 55, FIG. V-6-10 (mobile shear), at p. 56, FIG. V-6-14a (shear at logger) or at p. 58, FIG. V-6-15 (mobile shear).

Figure 17:
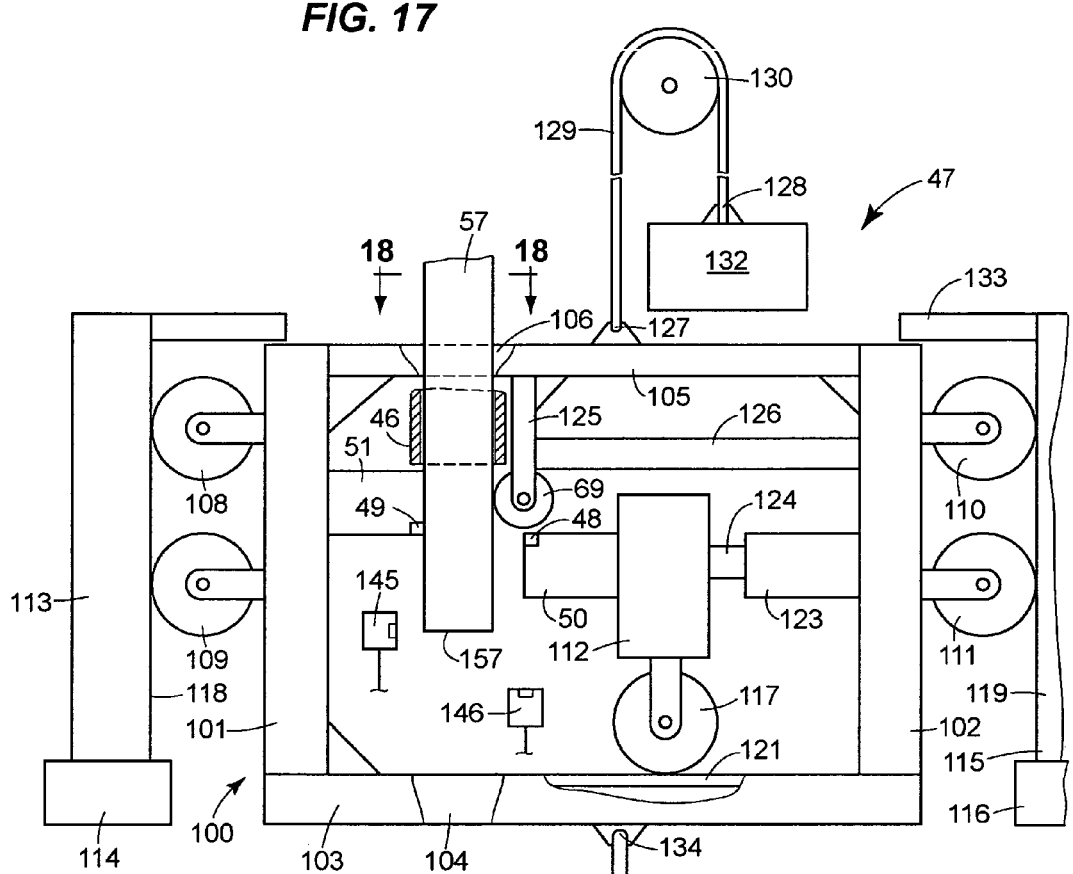
FIG. 17 is a side view, partially in section, and partially cut away, illustrating an embodiment of a traveling shear for use in an apparatus of the present invention.
Figure 18:
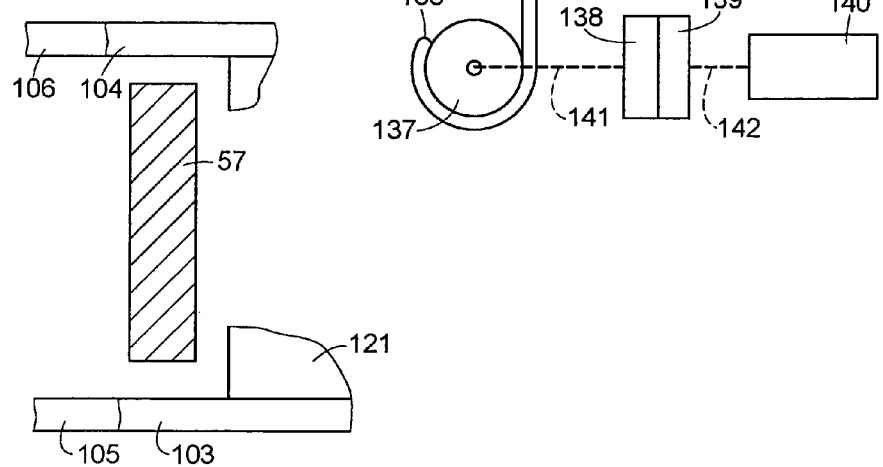
FIG. 18 is a sectional view, partially cut away, taken along like 18-18 in FIG. 17.

An embodiment of a mounting arrangement for a horizontally disposed, traveling guillotine shear is illustrated in FIGS. 17-18. Shear blades 48, 49 and their corresponding blade holders 50, 51 are mounted on a traveling frame indicated generally at 100 in FIG. 17. As viewed in FIG. 17, frame 100 includes left and right vertical members 101, 102, respectively, and these are connected by respective front and back bottom members 103, 104 and respective front and back top members 105, 106.

Mounted on the movable frame's left vertical member 101 are a pair of freely rotating wheels or rollers 108, 109 which ride along the vertical surface 118 of a left vertical stationary member 113 mounted on a base 114. Mounted on the movable frame's right vertical member 102 are a pair of freely rotating wheels or rollers 110, 111 which ride along the vertical surface 119 of a right vertical stationary member 115 mounted on a base 116. Wheels 108, 109 and 110, 111 may ride along vertical channels or rails in lieu of vertical surfaces 118, 119. Wheels 108, 109 and 110, 111 mount frame 100 for vertical movement.

Holder 51 for passive shear blade 49 is fixed on left vertical frame member 101. Holder 50 for active shear blade 48 is carried on a carriage 112 from which depends a freely rotating roller (or wheels) 117 which rides along a base member 121 supported by the frame's front and back bottom members 103, 104. The wheels at 117 mount carriage 112, blade holder 50 and shear blade 48 for back and forth movement along base member 121 which supports the weight of the carriage, the blade holder and the shear blade as they undergo back and forth movement.

Mounted on right vertical frame member 102 are one or more hydraulic cylinders 123 each containing a reciprocating piston connected to a piston rod 124 extending outwardly from cylinder 123 and having an outer end connected to carriage 112 for moving the carriage with blade holder 50 and shear blade 48 back and forth between positions corresponding to the shear blade's retracted position (FIG. 10) and its extended position (FIG. 11).

Depending from front and back top frame members 105, 106 are a pair of vertically disposed members, only one of which is shown at 125 in FIG. 17. Mounted between vertical members 125, 125 is freely rotating guide roller 69 (see FIGS. 10-12). Extending between each vertically disposed member 125 and the frame's right vertical member 102 is a horizontally disposed brace member 126.

Everything mounted on frame 100 is vertically moveable with frame 100 which, as noted above, carries wheels 108, 109 and 110, 111 which ride along vertical surfaces 118, 119 to mount frame 100 for reciprocal vertical movement between (i) a position corresponding to the upper position of shear blades 48, 49 and holders 50, 51 shown in FIG. 10 and (ii) a position corresponding to the lower position of the shear blades and their holders, discussed above in connection with FIGS. 11 and 12. One embodiment of equipment for producing the vertical movement of frame 100 will now be described.

Attached to the top of frame 100, e.g. at one or both of top frame members 105, 106, is an end 127 of at least one cable 129. Each cable 129 is trained over a respective pulley 130 mounted on compression apparatus 40 externally of frame 100. The cable has a terminal end 128 attached to a counterweight 132. The mass of counterweight 132 (or the mass of a plurality of such counterweights, if that be the case) exceeds the total mass of frame 100 and the load carried by frame 100. Accordingly, counterweight 132 normally urges frame 100 and its load to an upper position determined by a stop 133 extending horizontally toward frame 100 from right vertical external member 115. Stop 133 engages the top of frame 100 to determine the upper position of frame 100, a position that determines the upper position of shear blades 48, 49 and blade holders 50, 51, shown in FIG. 10. Frame 100 and its load are moved from their upper position to their lower position by the equipment described in the following paragraph.

Attached to the bottom of frame 100 is one end 134 of a cable 136 trained around a rotatably mounted cable drum 137 and having a terminal cable end 135 fixed to cable drum 137. Cable drum 137 is mounted on compression apparatus 40 externally of frame 100. Cable drum 137 is drivably connected at 141 to one side 138 of a magnetic clutch having another side 139 drivably connected at 142 to an electric motor 140. Drivable connection 142, clutch 138, 139, drivable connection 141, cable drum 137 and cable 136, in that sequence, link motor 140 to frame 100. When motor 100 is operated, and magnetic clutch 138, 139 is engaged, cable 136 is wound up around cable drum 137, and frame 100 and its load are moved in a downward direction, against the urging of counterweight 132.

Motor 140 need have a horsepower only as large as is necessary to move the difference in mass between (a) counterweight 132 and (b) frame 100 and its load. The smaller the difference in mass, the less horsepower required of motor 140.

When motor 140 is unlinked from frame 100, e.g., by disengaging magnetic clutch 138, 139, counterweight 132 urges frame 100 and its load in an upward direction, unwinding cable 136 from drum 137, until frame 100 engages stop 133. No motor is required to raise frame 100 and its load. That function is performed by counterweight 132. The only motor required is frame-lowering motor 140, and it is assisted in the performance of its function by the mass of frame 100 and its load. Frame-lowering motor 140 has a horsepower substantially less than the horsepower that would be required of a motor for raising frame 100 and its load in the absence of counterweight 132.

Figure 19:
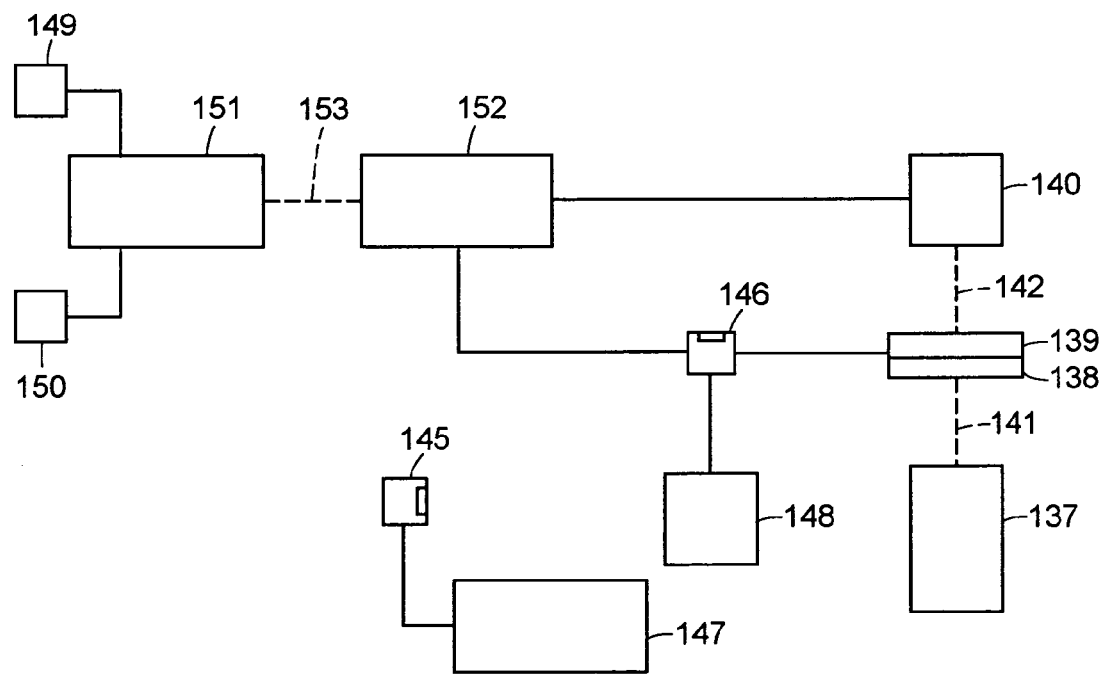
FIG. 19 is a block diagram of an embodiment of a control system for the traveling shear of FIG. 17.
Figure 20:
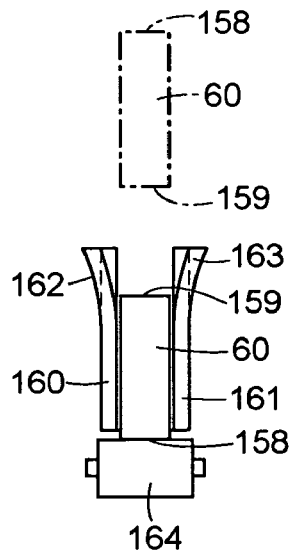
FIG. 20 is an end view illustrating a portion of the apparatus, downstream of the portion illustrated in FIG. 14, and for use in some embodiments of the present invention.
Figure 21:
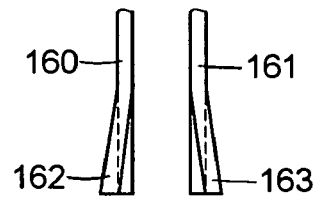
FIG. 21 is a plan view of one component of the embodiment shown in FIG. 20.

One embodiment of a system for controlling (a) the horizontal movements of shear blade 48 and (b) the vertical movements of frame 100 and its load are illustrated in the block diagram of FIG. 19 taken in conjunction with FIG. 17.

Hydraulic cylinder 123 (FIG. 17) is part of a hydraulic system 147 actuated by a light-sensitive switch 145 mounted on frame 100 at a location alongside the downward path of movement of slab 57 (FIG. 17). When the bottom or leading end 157 of slab 57 descends to the level of light sensitive switch 145, the switch actuates hydraulic mechanism 147 causing hydraulic piston rod 124 to move carriage 112, blade holder 50 and active shear blade 48 horizontally from (i) a position corresponding to the retracted position of the shear blade (FIGS. 10 and 17) toward (ii) a position corresponding to the extended position of active shear blade 48 (FIG. 11).

The horizontal movement described in the previous sentence is sensed by another light-sensitive switch 146 mounted on frame 100 below blade holder 50. Switch 146 connects a power source 148 to (a) the electromagnet on magnetic clutch 138, 139 and to (b) electric motor 140 via a current regulator 152. When switch 146 senses the start of horizontal shearing movement by active shear blade 48, the switch closes to deliver electric current to magnetic clutch 138, 139 and to electric motor 140, actuating the motor and the clutch and winding up cable 136 on cable drum 137 to pull frame 100 and its load downwardly.

The downward movement of shear blades 48, 49 is synchronized with the downward movement of slab 57 so that the slab and the shear blades move downwardly at the same speed. This is accomplished in the following manner, with reference to FIG. 19.

Electric motor 140 is a variable speed motor, the speed of which is controlled by the current delivered to motor 140 by current regulator 152. A sensor 149 senses the downward speed of slab 57, and another sensor 150 senses the downward speed of shear blade 48 or 49. Both speed sensors 149, 150 are mounted on apparatus 40 externally of vertically movable frame 47. Information on the speeds sensed by sensors 149, 150 are transmitted to a controller 151 where the speeds are compared. If an adjustment in the downward speed of shear blades 48, 49 is necessary to better synchronize the downward movement of the shear blades with the downward movement of slab 57, this is accomplished by controller 151 which is adjustably linked at 153 to current regulator 152. Controller 151 adjusts current regulator 152 so that the current flowing to variable speed motor 140, via current regulator 152, produces a motor speed that conforms the speed of downward movement of frame 100 and its load (including shear blades 48, 49) to the speed of downward movement of slab 57. Any change in the speed of downward movement of slab 57 will be reflected by an adjustment in the speed of variable speed motor 140.

When active shear blade 48 reaches its extended position (FIG. 11), at which slab portion 60 is severed from slab 57, a mechanical contact switch or the like (not shown) on frame 100 is engaged, e.g., by blade holder 50, and this actuates hydraulic mechanism 147 (FIG. 19) to retract the piston in hydraulic cylinder 123, in turn retracting shear blade 48 and its holder 50 from their extended position (FIG. 11) back toward the retracted position of FIG. 10. While this is occurring, motor 140 continues to operate, causing frame 100 and its load to continue their downward movement.

When active shear blade 48 and its holder 50 have returned to their retracted position (FIGS. 10 and 17), this is sensed by light-sensitive switch 146 which shuts off the flow of current from power source 148 to electric motor 140 and magnetic clutch 138, 139. This decouples or unlinks electric motor 140 from frame 100 and its load, allowing counterweight 132 to raise frame 100 and its load until the top of the frame engages stop member 133.

In lieu of the speed control system for the vertically traveling shear described above (FIG. 19), one may employ a speed control system akin to those utilized in conventional traveling shears that move along a horizontal path. In another variation, motor 140 and clutch 138, 139 may be drivingly connected to one or more of rollers 108, 109 or 110, 111, and cable drum 137 and cable 136 may be eliminated.

Referring again to FIG. 17, slab 57 continues to descend while frame 100 and its load are raised by counterweight 132 (also see FIG. 12). The severance of slab portion 60 from slab 57 (FIG. 11) exposes a new slab bottom end 157, and when the new slab bottom end has descended to a level where the slab is sensed by light sensitive switch 145, there is a repeat of the entire cycle of operations described above.

The dimensions, in a downstream direction, of a severed slab portion 60 can be adjusted by adjusting the level of light sensitive switch 145 on frame 100. The higher the level of switch 145 on frame 100, the sooner the start of the shearing movement by active shear blade 48, and therefore the smaller the dimension, in a downstream direction, of a slab portion 60.

In lieu of light sensitive switches 145, 146, one may employ other types of switches to control hydraulic system 147 and motor 140. For example, light sensitive switch 145 may be replaced with a mechanical contact switch placed at the same vertical level as switch 145 (in FIG. 17) but disposed along the margin of the path followed by slab 57 as the slab descends, for engagement of the switch with the slab. Similarly, light sensitive switch 146 may be replaced with a mechanical contact switch vertically aligned with the location of switch 146 in FIG. 17 but disposed along the margin of the horizontal path followed by shear blade 48 and its holder 50 as they move toward the shear blade's extended position, for engagement of the switch with shear blade holder 50.

When slab 57 is unengaged by traveling shear 47, the slab is suspended from compression rolls 44, 45 and a gravitational force, corresponding to the mass or weight of the suspended slab, pulls downwardly on the slab. The greater the length of the suspended slab, the greater the downward pull of the gravitational force. If the downward pull of the gravitational force exceeds the cohesive force holding the slab together, the slab can be pulled apart before the slab is engaged by traveling shear 47.

One expedient, for preventing the slab from being pulled art by gravitational force, is to place traveling shear 47 at a location, close to upstream compression rolls 44, 45, where the gravitational force does not exceed the cohesive force of the slab. If structural or other considerations do not allow the traveling shear to be so located, another expedient may be employed.

Figure 38:
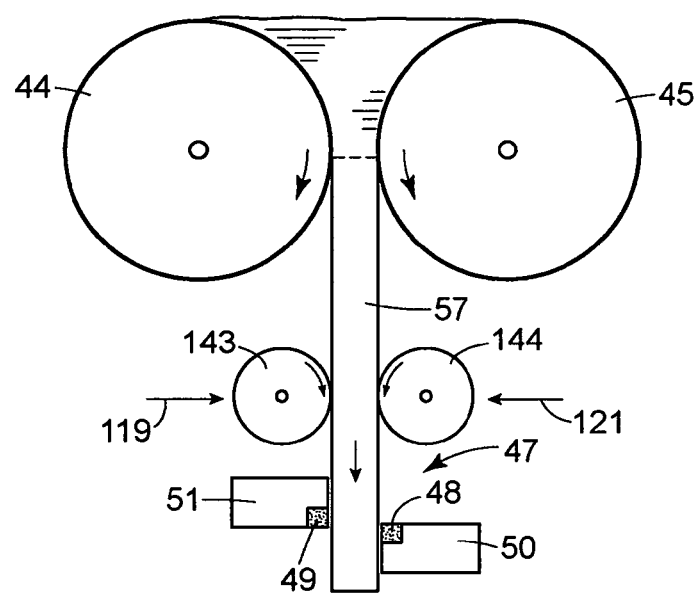
FIG. 38 is a fragmentary side view illustrating a variation of the embodiment of FIG. 1b.

Referring to FIG. 38, one such expedient, for preventing the slab from being pulled apart, utilizes one or more pairs of pincher rolls 143, 144, located between traveling shear 47 and the upstream compression rolls 44, 45. Each pair of pincher rolls 143, 144 engages slab 57 between the two rolls. In each pair, one or both of the rolls may be spring loaded or hydraulically loaded to urge a roll toward the slab so as to pinch the slab between the two rolls. This is indicated representationally by the arrows 119, 121 in FIG. 38. In this way, the pair of pincher rolls supports a substantial part of the weight of the slab upstream of the pair of pincher rolls and offsets enough of the downward pull of the gravitational force on the slab to prevent the slab from being pulled apart.

One or both of the pincher rolls may be freely rotating; or one or both may be rotatably driven, in which case the rotational speed of the driven rolls is controlled so that the speed of descent of the slab downstream of the pincher rolls is the same as the speed of descent of the slab between (a) the upstream compression rolls 44, 45 and (b) the pincher rolls.

Referring back to FIG. 7, the second pair of compression rolls 94, 95, located between (a) upstream compression rolls 44, 45 and (b) traveling shear 47, inherently acts as a pair of pincher rolls. Accordingly, when the embodiment of FIG. 7 is employed, rolls 94, 95 should be situated along path 41 at a location, relative to shear 47, for preventing the slab from being pulled apart. In this regard, any pair of pincher rolls (e.g., 143, 144 in FIG. 38) can also function to further compress slab 57, but that additional function is optional.

Referring again to FIG. 14, each slab portion 60 has a pair of sheared edges 158, 159 corresponding to the two locations where a given slab portion 60 had been engaged by traveling shear 47 to separate the slab portion first from a preceding, downstream slab portion 60 and then from upstream slab 57 (see FIG. 11). FIGS. 20-24 are directed to an embodiment of the present invention comprising a pair of additional compression rolls 154, 155 for engaging a slab portion 60 along sheared edges 158, 159 to further compress the scrap metal strip in the slab portion to increase the density of slab portion 60.

The additional pair of compression rolls 154, 155 may be used in conjunction with the embodiment of FIG. 14, in which slab portion 60 has previously undergone two upstream compression steps, first at compression rolls 44, 45 (FIG. 16) and then at the second pair of compression rolls 84, 85 (FIG. 14); or, alternatively, the additional pair of compression rolls 154, 155 may be used immediately downstream of the shearing step (FIG. 11), without employing a compression step at compression rolls 84, 85 (FIG. 14). In either alternative, slab portion 60 descends by gravity toward a pair of spaced-apart, vertically disposed guide plates 160, 161 (FIGS. 20-21) each having a respective upper, outwardly flared portion 162, 163 at the upstream end of the guide plate.

Figure 22:
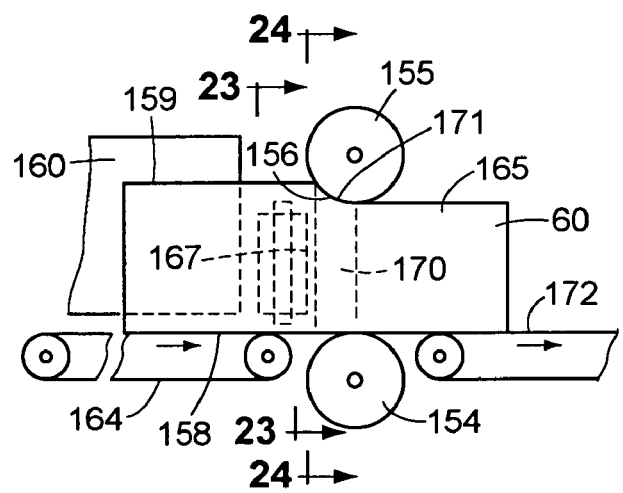
FIG. 22 is a side view of the embodiment of FIG. 20 and showing additional apparatus portions downstream of the portion shown in FIG. 20.
Figure 23:
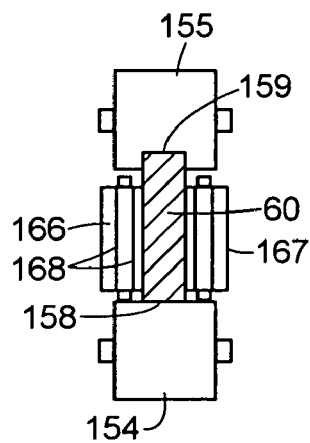
FIG. 23 is a sectional view taken along line 23-23 in FIG. 22.
Figure 24:
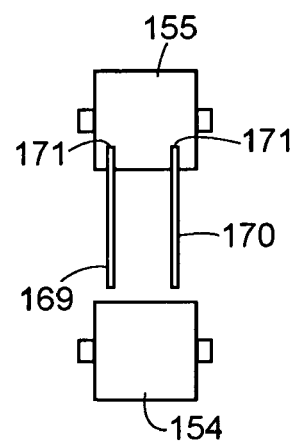
FIG. 24 is a sectional view taken along line 24-24 in FIG. 22, with some parts deleted for purposes of clarity.

Guide plates 160, 161 direct slab portion 60 downwardly between guide plates 160, 161 onto a conveyor 164 which conveys slab portion 60 downstream toward the additional pair of compression rolls 154, 155 which are horizontally disposed and vertically spaced apart (FIGS. 22-24). Guide plates 160, 161 maintain slab portion 60 in a vertical disposition with sheared edges 158, 159 positioned for engagement by lower and upper compression rolls 154, 155, respectively, as slab portion 60 is delivered to the compression rolls.

Located immediately upstream of compression rolls 154, 155 are a pair of vertically disposed, spaced apart, drive rolls 166, 167 which engage slab portion 60 between them and propel the slab portion into engagement with compression rolls 154, 155. Each drive roll 166, 167 may have vertically disposed surface ribs or projections 168, 168 (FIG. 23) to facilitate the driving engagement of a drive roll with slab portion 60. The drive rolls maintain their engagement with slab portion 60 until at least a downstream part 165 of slab portion 60 has been compressed by the compression rolls.

As slab portion 60 undergoes compression, the slab portion is contained between a pair of vertically disposed containment plates 169, 170 each having an upper edge 171 that is contoured to follow the curve of a compression roll, along the lower, upstream quadrant 156 of the compression roll (FIG. 22). Upper plate edge 171 is spaced from the adjacent surface of the compression roll, providing a slight clearance to allow for rotation of the roll.

Conveyer 164, guide plates 160, 161 and drive rolls 166, 167 cooperate to deliver slab portion 60 to compression rolls 154, 155 in a disposition that enables a compression roll 154 or 155 to engage a respective sheared edge 158 or 159. After it is compressed at rolls 154, 155, the slab portion is conveyed downstream on conveyor 172.

There are some embodiments of the present invention in which the scrap metal strip is subjected to one or more mechanical precompression steps upstream of compression rolls 44, 45, and these embodiments will now be described.

Figure 25:
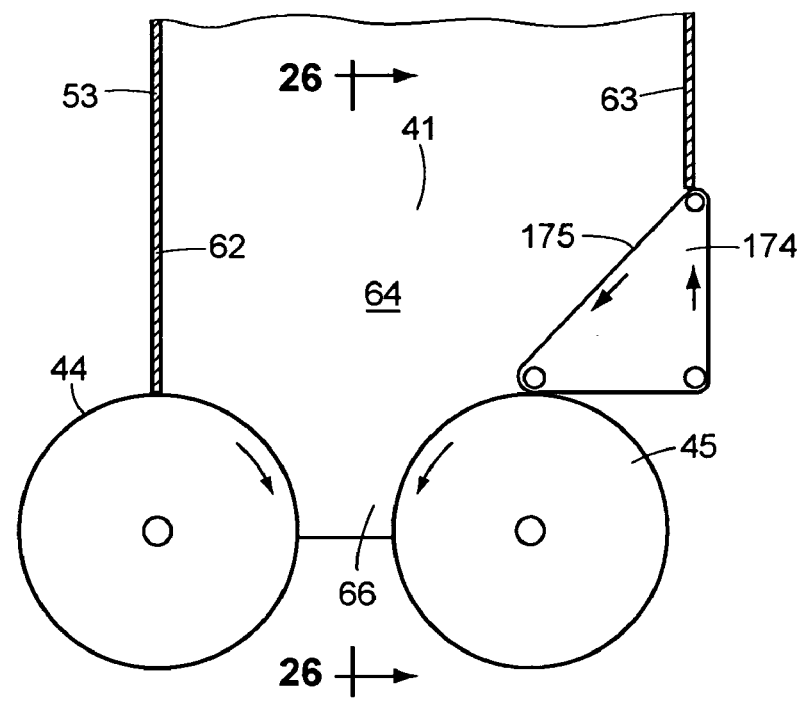
FIG. 25 is a fragmentary side view, similar to FIG. 1a, illustrating another embodiment of an apparatus in accordance with the present invention.
Figure 26:
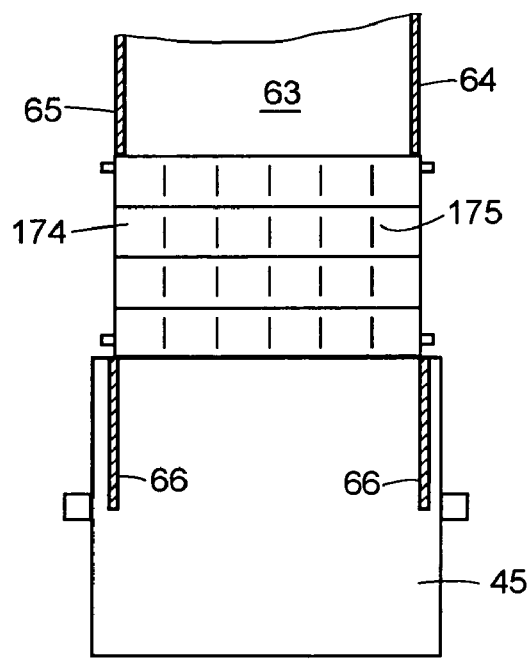
FIG. 26 is a sectional view taken along line 26-26 in FIG. 25.

Referring to FIGS. 25-26, located along processing path 41, upstream of compression rolls 44, 45 is a mechanical precompression device 174 in the form of a continuous tread member having a portion 175 sloping inwardly in a downstream direction. Tread-like device 174 is akin to the treads or tracks on a crawler tractor. A more detailed illustration of a tread-like precompression device is contained in Nijkerk, p. 96, FIG. V-11-3a; also see p. 88, FIG. V-11-2, item (4). Tread-like device 174 cooperates with vertical wall 62 on chamber 53 to precompress the scrap metal strip in stream 56 (shown in FIG. 1b) in a horizontal direction, without interrupting the downstream movement of the strip along processing path 41 toward compression rolls 44, 45. Tread-like device 174 precompresses the strip in the same direction as the compression direction at compression rolls 44, 45.

Figure 29:
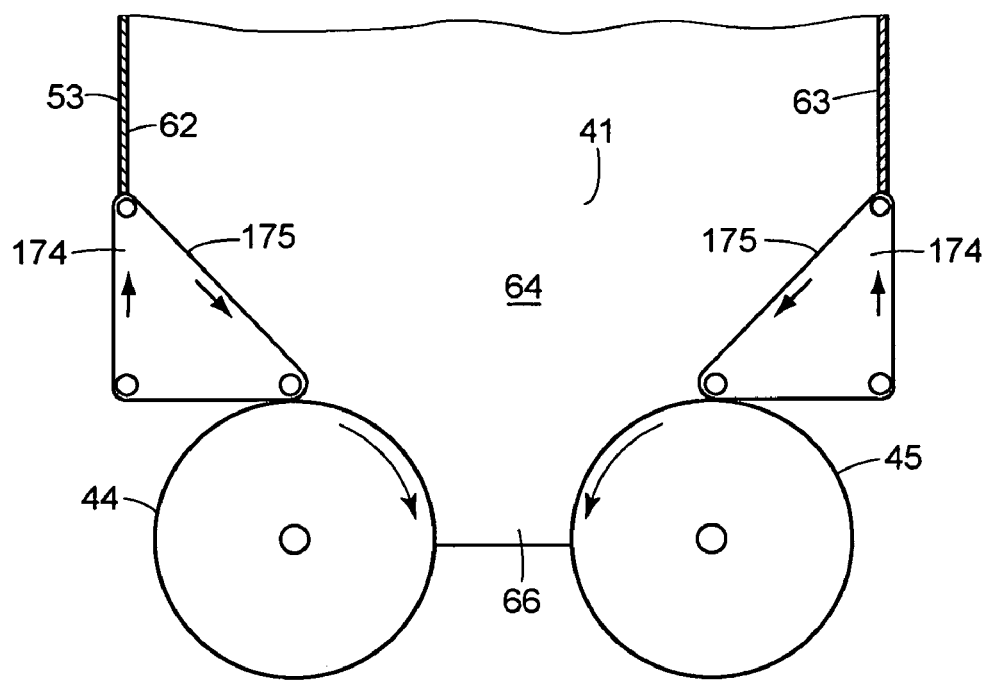
FIG. 29 is a fragmentary side view, similar to FIG. 25, illustrating yet another embodiment of the present invention.

A variation of the embodiment of FIGS. 25-26 is shown in FIG. 29 which illustrates an apparatus that employs two tread-like devices 174, 174 that precompress the scrap metal strip between devices 174, 174 and in the same direction as the compression direction at compression rolls 44, 45.

Figure 27:
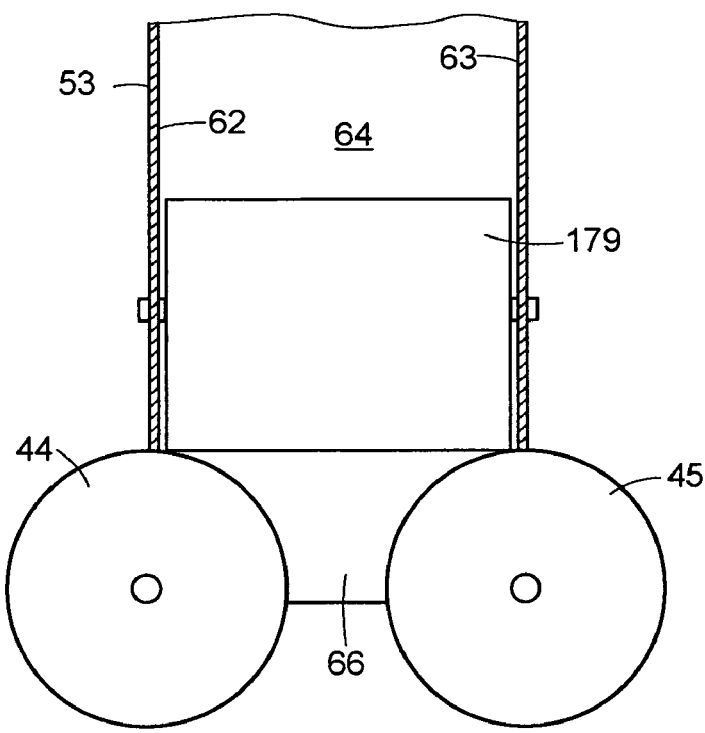
FIG. 27 is a fragmentary side view, similar to FIG. 25, illustrating a further embodiment of the present invention.
Figure 28:
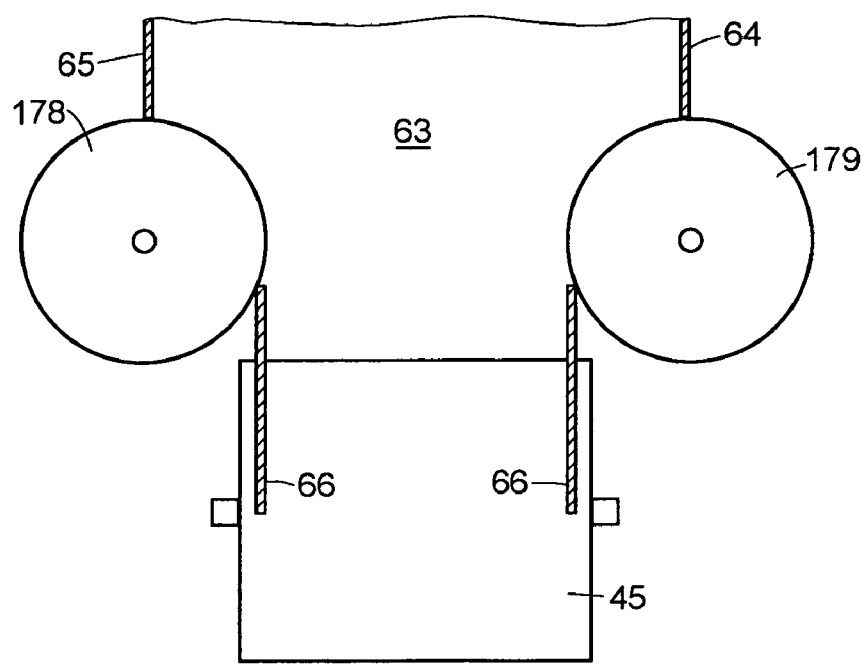
FIG. 28 is an end view, partially in section, of the embodiment illustrated in FIG. 27.

Another embodiment employing mechanical precompression is shown in FIGS. 27-28 and comprises a pair of precompression rolls 178, 179 located upstream of compression rolls 44, 45 along processing path 41. Precompression rolls 178, 179 are horizontally disposed in an axial direction transverse to the axial direction in which compression rolls 44, 45 are disposed. Accordingly, precompression rolls 178, 179 precompress the scrap metal strip in a direction transverse to the compression direction at rolls 44, 45.

Figure 30:
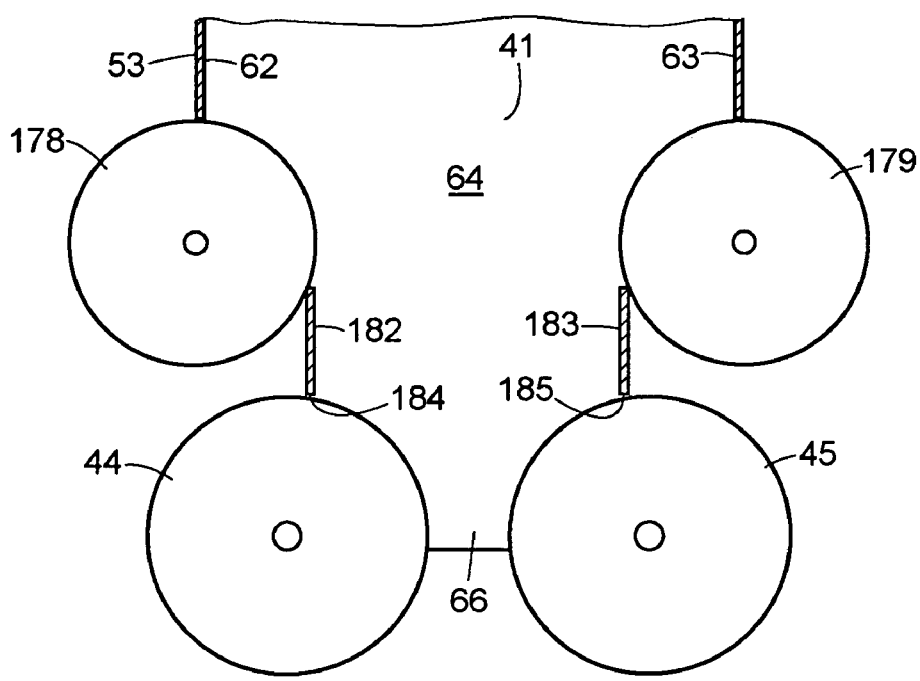
FIG. 30 is an end view, partially in section, showing a variation of the embodiment illustrated in FIG. 28.

A variation of the embodiment of FIGS. 27, 28 is illustrated in FIG. 30 wherein upstream precompression rolls 178, 179 are axially disposed in a direction parallel to the axial disposition of compression rolls 44, 45. In this embodiment, rolls 178, 179 precompress the scrap metal strip in the same direction as the compression direction at compression rolls 44, 45.

In addition, in the embodiment of FIG. 30, chamber 53 includes a pair of vertical wall portions 182, 183 disposed between (i) upstream precompression rolls 178, 179 and (ii) downstream compression rolls 44, 45. Wall portions 182, 183 depend tangentially downstream from respective precompression rolls 178, 179 and guide the precompressed scrap metal strip as the strip moves downstream toward compression rolls 44, 45. Each wall portion 182, 183 has a respective lower edge 184, 185 which is located and functions in a manner akin to lower edges 72, 73 on chamber walls 62, 63 in the embodiment of FIG. 1a.

Figure 31:
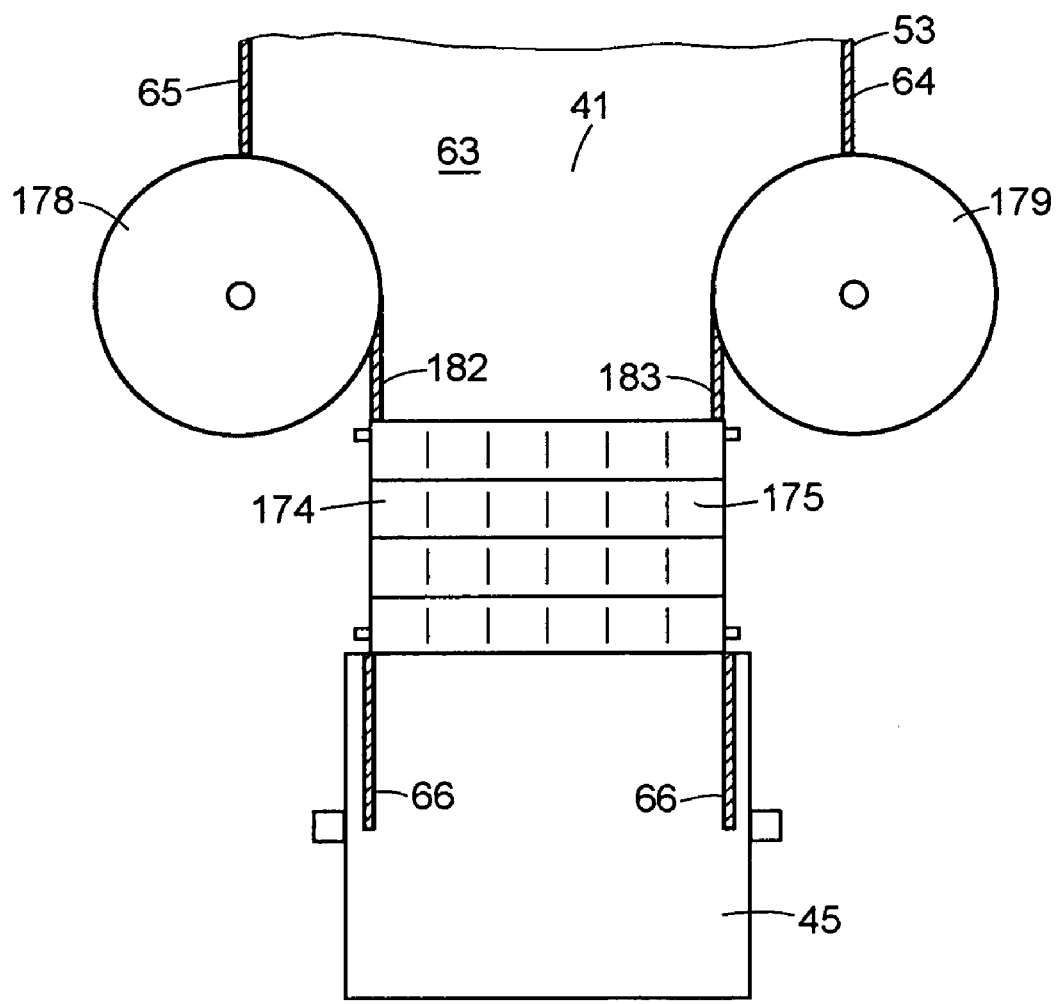
FIG. 31 is an end view, partially in section, showing a variation incorporating components from the embodiments of both FIGS. 28 and 29.

Referring now to FIG. 31, in this embodiment there are a pair of tread-like precompression devices 174, 174 located upstream of the compression rolls, as in FIG. 29. (The graphic limitations inherent in the sectional drawing of FIG. 31 allow for the showing of only one precompression device 174 and one compression roll, here 45, but two of each are included in the apparatus, as in FIG. 29.) Located upstream of precompression devices 174, 174 are a pair of precompression rolls 178, 179 similar to those shown in FIGS. 28 and 30.

Precompression rolls 178, 179 precompress the scrap metal strip in a direction transverse to the compression direction at compression rolls 44, 45 and help feed the precompressed strip downstream toward tread-like precompression devices 174, 174 which further precompress the strip, in a direction the same as the compression direction at compression rolls 44, 45.

In a variation of the embodiment of FIG. 31, one may reverse the locations, along processing path 41, of (a) tread-like devices 174, 174 and (b) precompression rolls 178, 179 so that rolls 178, 179 are downstream of devices 174, 174.

In all the embodiments and variations of FIGS. 25-31, the precompression rolls 178, 179 and the precompression devices 174, 174 precompress the scrap metal strip without interrupting the downstream movement of the strip toward compression rolls 44, 45.

From the standpoint of compressing the scrap metal strip and urging or moving the compressed strip downstream, a pair of tread-like devices 174, 174 and a pair of compression rolls, such as 178, 179 (or 44, 45), are functional equivalents, and a pair of one may be substituted for a pair of the other.

When precompression is employed, the linear surface speed of compression rolls 44, 45 is controlled to reflect the linear speed at which the precompressed stream of scrap metal strip is delivered to the compression rolls by the upstream precompression rolls or devices.

The processing path is, in its most preferable form, truly vertical, i.e., straight up and down (FIGS. 1a-1b). In a slightly broader context, the processing path can be "essentially vertical", a term which encompasses both (i) a path that is straight up and down, i.e., true vertical, and (ii) a path that deviates from true vertical by a few degrees, so long as the features and advantages provided by a true vertical path are substantially provided by the path that deviates from true vertical. Thus, an essentially vertical path enables a continuous stream of scrap metal strip to move downstream under the urging of gravity without substantial impediment; it provides each of a succession of adjacent stream parts with a substantially uniform cross section when the stream part arrives at the compression rolls; and it enables overhanging strip parts at the upstream end of the processing path to be pulled into the charging chamber as the continuous stream of scrap metal strip descends along the processing path.

Other embodiments of the present invention employ the combination of compression rolls and traveling shear, in that sequence, together with a processing path which, although not essentially vertical, has a substantial vertical component. A processing path with a substantial vertical component is a path that has a downward slope steep enough to enable the stream of scrap metal strip to move downstream along the path under the urging of gravity, prior to the stream undergoing compression. Any angle that satisfies this requirement defines a path that has a substantial vertical component. Preferably, the angle or slope is at least 45° and, most preferably, at least 60°. Devices which augment gravitational descent, such as a vibrating ramp along the sloping path, may be employed (see, e.g., Nijkerk, p. 61, FIG. V-6-18b), and that path would be defined as one that has a substantial vertical component. As used herein, the term "at least a substantial vertical component" encompasses all of the following dispositions: (1) a path that has a substantial vertical component; (2) a path that is essentially vertical; and (3) a path that is truly vertical, i.e., straight up and down.

Figure 32:
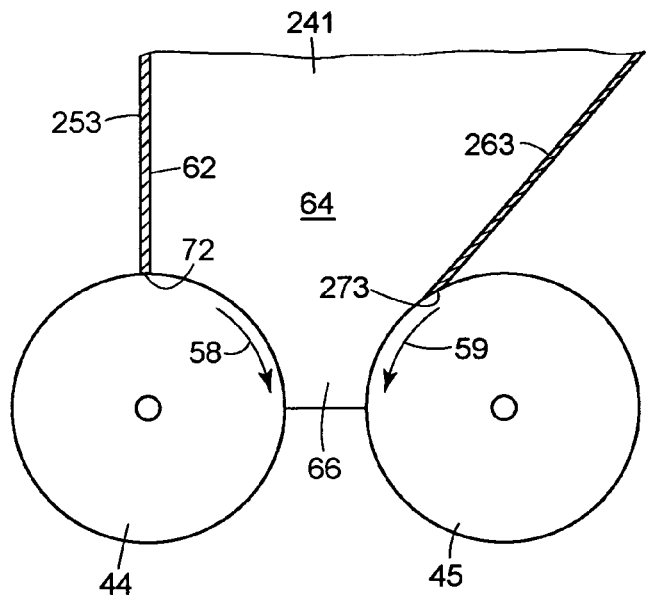
Figure 33:
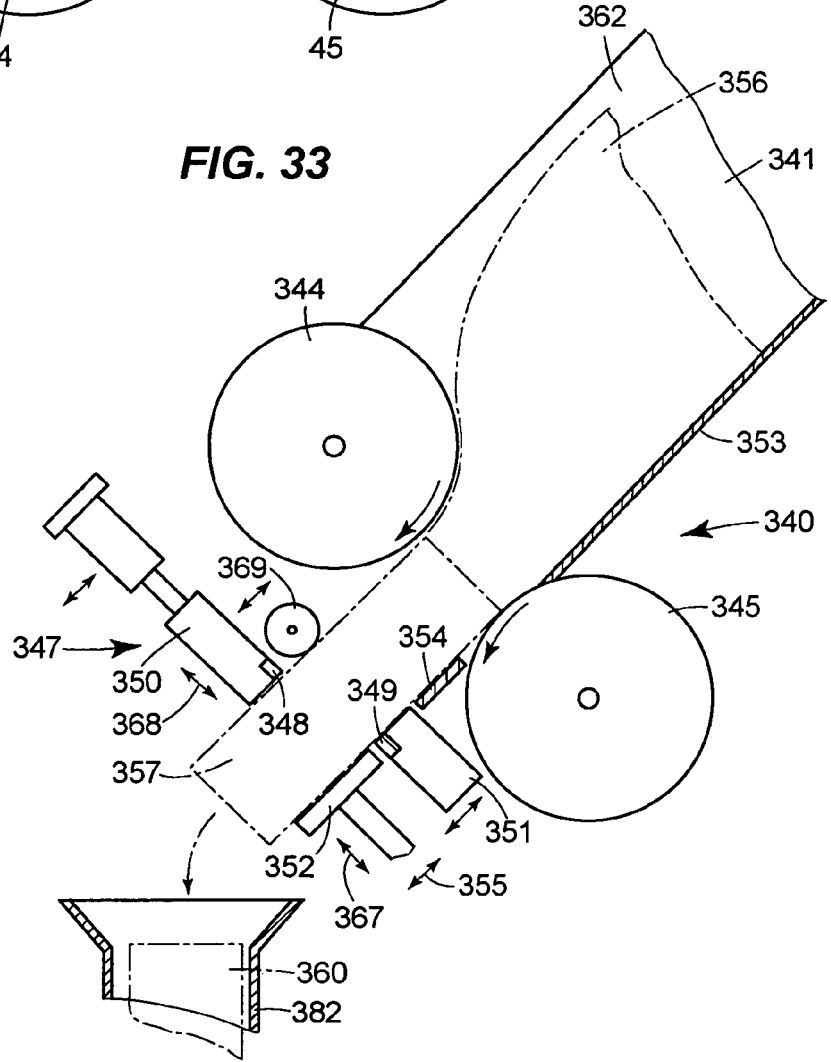
FIG. 33 is a side view, partially in section, illustrating a portion of yet another embodiment of the present invention.
Figure 34:
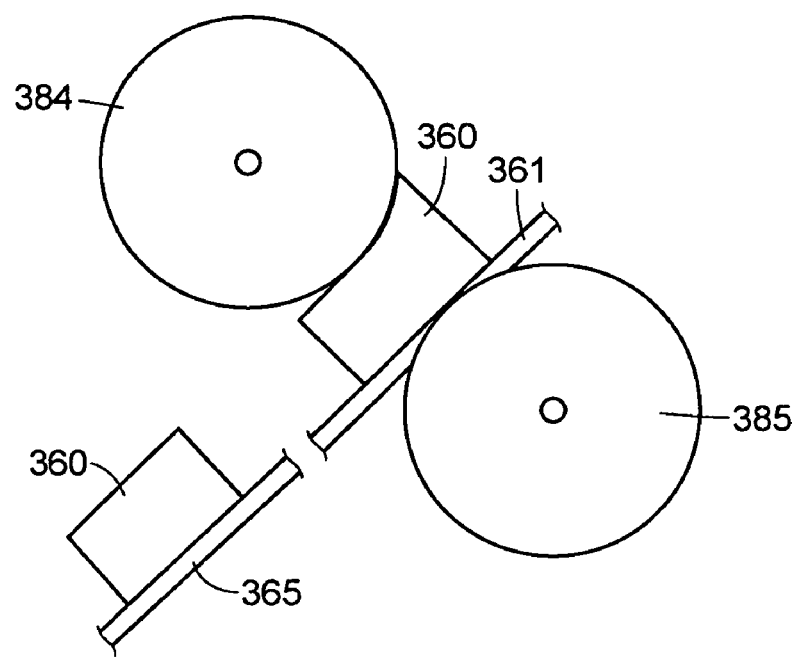
FIG. 34 is a side view illustrating a downstream portion of the embodiment of FIG. 33.

Examples of embodiments of the present invention having a processing path with a substantial vertical component are illustrated in FIGS. 32-34.

Referring initially to FIG. 32, this embodiment comprises a charging chamber 253 in which the chamber wall 263 opposite vertical wall 62 is sloped and has a substantial vertical component. The other walls of chamber 253 are like the vertical walls of chamber 53 in FIG. 1a. Sloped chamber wall 263 terminates at a lower edge 273 which is tangential to the surface of roll 45 at a location where the surface of roll 45 is moving downwardly and inwardly as shown by arrow 59 in FIG. 32. There is a slight clearance between lower edge 273 and the surface of roll 45 to allow for the rotation of roll 45.

Scrap metal strip in chamber 253 moves downwardly through chamber 253 under the urging of gravity and along a processing path 241. The scrap metal strip in that part of processing path 241 adjacent vertical wall 62 moves vertically downwardly toward compression rolls 44, 45; the scrap metal strip in that part of processing path 241 adjacent sloped wall 263 moves along a path part that has a substantial downward vertical component. Other than the differences noted in the preceding sentences in this paragraph, or implicit therein, the operation of the embodiment illustrated in FIG. 32 is substantially the same as the operation of apparatus 40 in FIGS. 1a-1b.

FIG. 33 is directed to an embodiment 340 in which the entire processing path 341 has a downward slope with a substantial vertical component, from the path's upstream end through those portions of the path where the compression and shearing steps are performed.

In this embodiment, a stream 356 of scrap metal strip moves, under the urging of gravity, along a ramp 353 having a substantial downward vertical component. Stream 356 is contained between a pair of vertical walls (one of which is shown at 362) as the stream moves along ramp 353.

The scrap metal strip in stream 356 is compressed by compression rolls 344, 345 into a slab 357 which is cut into slab portions 360 by a traveling shear 347 located immediately downstream of compression rolls 344, 345. Slab 357 is supported, between the compression step and the shearing step, by a supplemental ramp 354 located between lower compression roll 344 and passive shear blade holder 351.

A conventional guillotine shear employs a hydraulic clamp immediately upstream of the active shear blade (Nijkerk, p. 53, FIG. V-6-8 and p. 58, FIG. V-6-16a). The hydraulic clamp holds in place a workpiece undergoing shearing; it also counteracts the upward pressure from that part of the workpiece immediately upstream of the shear's active blade, an upward pressure which occurs as a reaction to the downward stroke of the active shear blade. Absent the hydraulic clamp, the upstream part of the workpiece would tend to curl up against the head or holder of the active shear blade (see Nijkerk p. 61, col. 1). No such hydraulic clamp is employed with shear 347 of apparatus 340; to the extent that the functions performed by the hydraulic clamp may be needed, it is projected that they would be performed by compression rolls 344, 345 alone or together with guide roller 369. Similarly, no hydraulic clamp would be employed with shear 47 in the embodiment of the apparatus discussed above; the functions of the hydraulic clamp, if needed, would be performed by compression rolls 44, 45 alone (FIG. 1a) or together with guide roll 69. In this connection, FIG. 11 shows slab 57 pressed against guide roll 69 in reaction to the completion of the cutting stroke by active shear blade 48.

Referring again to FIG. 33, after being severed from slab 357, a slab portion 360 falls into a guide chute 382 like guide chute 82 shown in FIG. 14, and as in the embodiment of FIG. 14, guide chute 382 directs the slab portion vertically downwardly toward a second pair of compression rolls for further compression of the scrap metal strip in slab portion 360 (see FIG. 14 and its accompanying description).

As an alternative to employing the arrangement of FIG. 14, one may employ the arrangement illustrated in FIG. 34 to further compress the scrap metal strip in slab portion 360. More particularly, after being severed from slab 357, slab portion 360 falls, or is directed (e.g. by chute 382), onto a second ramp 361 along which slab 360 moves, under the urging of gravity, toward a second pair of compression rolls 384, 385 which further compress the scrap metal strip in slab 360 and direct the slab downstream onto a third ramp 365. In lieu of second ramp 361, one may employ a conveyor belt and/or drive rolls, as in the embodiment of FIGS. 22-23, to urge slab 360 toward compression rolls 384, 385.

In the embodiment of FIG. 33, traveling shear 347 is, for the most part, akin to traveling shear 47 described above. Shear 347 includes active and passive shear blades 348, 349 and their respective blade holders 350, 351 as well as a guide roller 369 akin to guide roller 69 in FIGS. 10-12.

In addition, and unlike shear 47, shear 347 comprises a support table 352 which, with supplemental ramp 354, helps support slab 357 before the slab is engaged by active shear blade 348. Support table 352 moves along a reciprocating path 367 in synchronism with the movement of active shear blade 348 along its reciprocating shearing path 368. An arrangement of the type described in the preceding sentences of this paragraph is described and shown in more detail in Nijkerk at pp. 58-59, FIGS. V-6-16a and 16b. Support table 352 also moves upstream and downstream along the same reciprocating travel path 355 as the other components of traveling shear 347.

Figure 35:
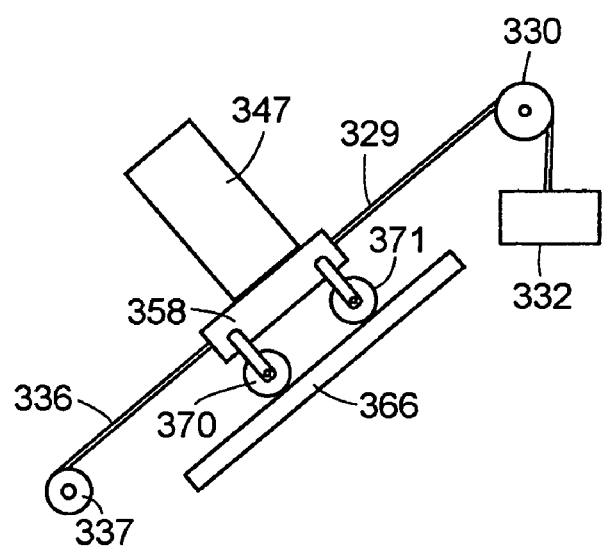
FIG. 35 is a diagrammatic side view of a traveling shear for use in an embodiment of the present invention.

Shear 347 is moved back and forth, downstream and upstream, along its travel path 355 by an arrangement similar to that employed for traveling shear 47 (see FIGS. 17-19). The corresponding arrangement for traveling shear 347 is shown diagrammatically in FIG. 35.

Traveling shear 347 (shown in block diagram in FIG. 35) has a base 358 supported by a plurality of wheels or rollers 370, 371 which ride on a plurality of rails, one of which is shown at 366. The rails are disposed at the same slope as ramps 353 and 354 (FIG. 33). Attached to the upstream end of traveling shear 347 at base 358 is a cable 329 which extends around a pulley 330 and terminates at a counterweight 332. Attached to the downstream end of traveling shear 347 is a cable 336 which terminates at a cable drum 337 driven by an electric motor (not shown).

The operation of traveling shear 347 and the components thereof, described in the preceding paragraph, is essentially the same as the operation of traveling shear 47, described above in connection with FIGS. 17-19.

Although the embodiment of FIG. 33 may not provide all the features and advantages provided by the embodiments that employ an essentially vertical processing path (e.g. FIGS. 1a-1b), the embodiment of FIG. 33 does have the advantage of providing a process that is continuous. Moreover, although self-precompression of the strip, provided by embodiments that employ a vertical column of material (FIGS. 1a-1b), is not available with the embodiments of FIG. 33, precompression upstream of compression rolls 344, 345 can be otherwise provided. For example, apparatus 340 may include, upstream of the compression rolls, another set of compression rolls or a tread-like precompression member, or both (e.g., see Nijkerk, p. 96, FIG. V-11-3a and p. 98, FIG. V-11-5, showing such devices positioned along a downwardly inclined processing path).

Figure 36:
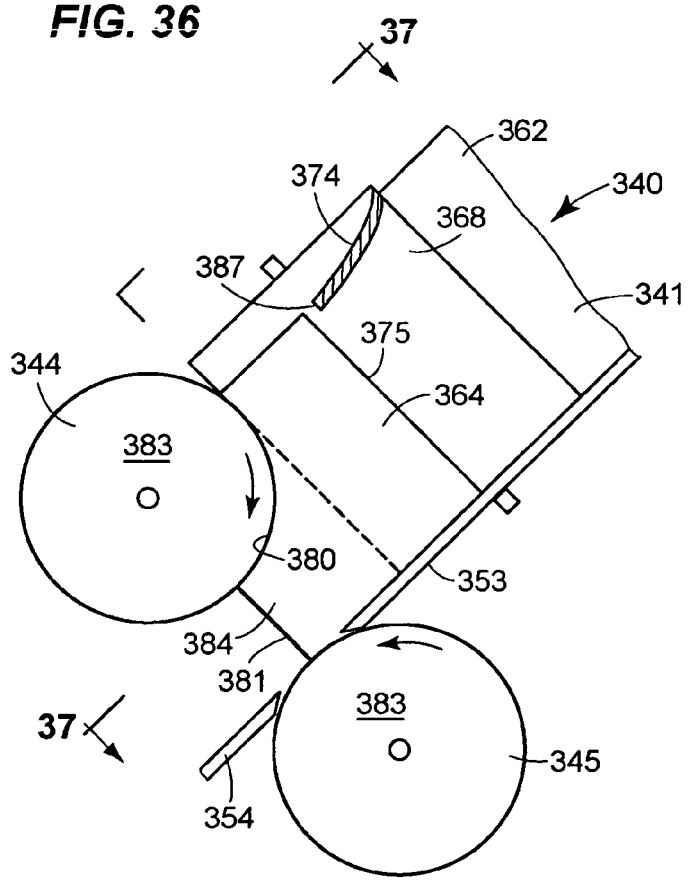
FIG. 36 is a fragmentary side view, of a variation of the embodiment of FIG. 33 with a portion of the apparatus removed.
Figure 37:
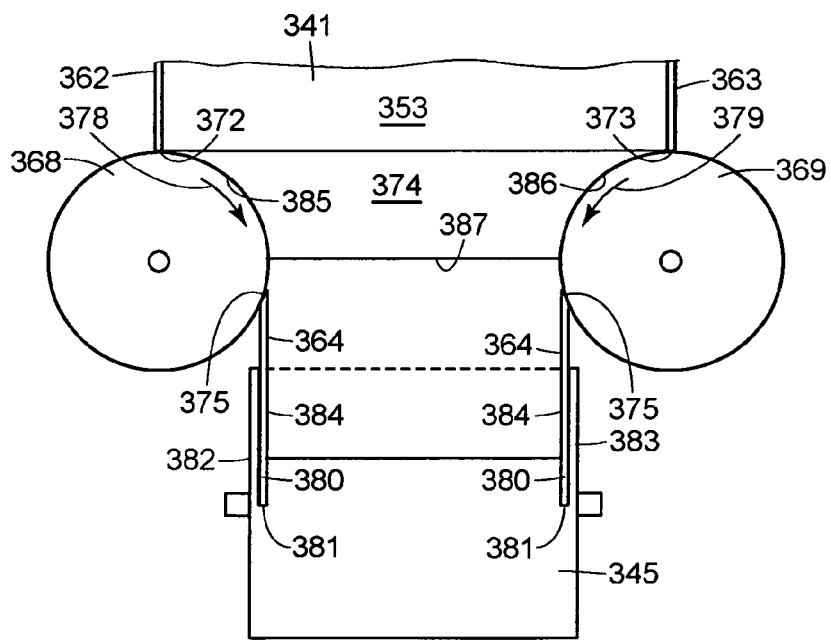
FIG. 37 is a view taken along line 37-37 in FIG. 36, with a portion of the apparatus removed.

FIGS. 36 and 37 illustrate a variation of apparatus 340 (FIG. 33) comprising a pair of precompression rolls 368, 369 located upstream of compression rolls 344, 345 along processing path 341. Precompression rolls 368, 369 have an axial disposition transverse to the axial disposition of compression rolls 344, 345. Accordingly, precompression rolls 368, 369 precompress the scrap metal strip in a direction transverse to the compression direction at rolls 344, 345; and rolls 368, 369 urge the precompressed scrap in a downstream direction.

FIG. 37 shows both containment walls 362, 363 of apparatus 340. In the variation of apparatus 340 shown in FIG. 33, each containment wall (e.g., 362) terminates at a respective compression roll (e.g., 344). In the variation shown in FIGS. 36, 37 each containment wall 362, 363 terminates at a respective precompression roll 368, 369. There is another pair of containment walls 364, 364 each extending between a respective precompression roll 368, 369 and a respective compression roll 344, 345.

Containment walls 362, 363 have respective downstream edges 372, 373 each spaced a short distance from the surface of an adjacent roll 368, 369 to provide a clearance for the roll to rotate. Containment walls 362, 363 direct scrap metal strip, moving downstream along processing path 341, toward that part of a roll surface that is rotating in a direction having a downstream component (arrows 378, 379 in FIG. 37).

Each containment wall 364 has an upstream edge 375 spaced a short distance from the surface of a respective precompression roll 368, 369 to provide a clearance for the roll to rotate. As shown in FIG. 37, each containment wall 364 extends tangentially downstream from a respective precompression roll 368, 369. Walls 364, 364 guide the precompressed scrap metal strip as the strip moves downstream toward compression rolls 344, 345.

Figure 3:
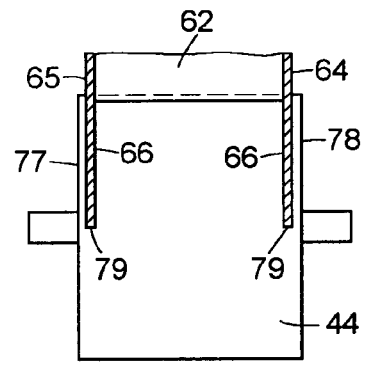
Figure 6:
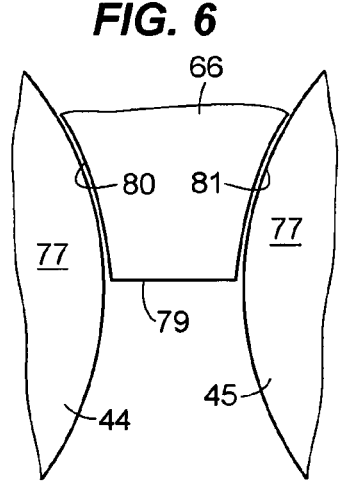

Each wall 364 has an edge 380 which follows the contour of upper compression roll 344 and is spaced a short distance from the surface of the roll to provide a clearance for the roll to rotate. Each wall 364 is disposed adjacent a respective roll end 382, 383 (FIG. 37). Each wall 364 has a downstream portion 384 terminating at an edge 381 disposed at the narrowest gap between rolls 344, 345. Downstream wall portions 384, 384 function like depending portions 66, 66 in apparatus 40 (FIGS. 3 and 6).

Referring again to precompression rolls 368, 369, disposed between these rolls, adjacent an upper portion of the rolls, is an upper containment plate 374 having a pair of opposed side edges 385, 386 (FIG. 37) each of which follows the contour of a respective precompression roll 368, 369, with a slight clearance to allow for rotation of the rolls. Containment plate 374 is preferably slightly convexly curved in a downward and downstream direction (FIG. 36) and terminates at a downstream edge 387 located at the narrowest gap between precompression rolls 368, 369 (FIG. 37).

The precompressed scrap metal strip moving downstream from precompression rolls 368, 369 has a volume defined in part by the narrowest gap between rolls 368, 369 and in part by a dimension extending transversely to the direction of processing path 341. Upper containment plate 374 puts a maximum limit on that dimension. The maximum limit can be adjusted by adjusting the distance between plate 374 and ramp 353.

With reference to FIGS. 1b and 33, one may employ a semi-continuous version of the present invention in which the shear (e.g. 47 in FIG. 1b or 347 in FIG. 33) does not travel. Instead, the shear is stationary, and rotation of the compression rolls (e.g., 44, 45 or 344, 345), which feed the slab to the shear, is interrupted long enough to enable the stationary shear to cut a slab portion (60 or 360) from the stationary slab. Rotation of the compression rolls is interrupted when the slab is at a predetermined position, relative to the shear, for cutting from the slab a slab portion having the desired dimension in a downstream direction. The non-rotating compression rolls clamp the slab between them and prevent the slab, and the scrap metal strip upstream of the slab, from descending downstream during the cutting operation. Because the slab is restrained against downstream movement by the clamping action of the compression rolls, there is no need to block the path of movement downstream of the shear while a slab portion is being cut from the slab by the shear. After a slab portion has been severed from the slab, rotation of the compression rolls is resumed to again move the slab downstream. As noted above, the shear does not travel downstream and upstream along the processing path, and the components for enabling the shear to do so are excluded from this version of the apparatus. Otherwise the apparatus and processing steps are essentially the same as in the fully continuous embodiments described above. The interruption and resumption of rotation of the compression rolls can be controlled manually with an on-off switch for activating a magnetic clutch that links the compression rolls to a motor that drives the compression rolls (like magnetic clutch 138, 139 and associated elements in FIGS. 17 and 19); or the on-off functions may be performed automatically using a light-sensitive switch that is actuated by movement of the shear's active blade and holder (e.g., like light sensitive switch 146 in FIGS. 17 and 19).

Referring again to FIG. 1a, scrap metal strip may be delivered to chamber entrance 54 at the upstream end 42 of processing path 41 with conventional delivery equipment heretofore utilized in conjunction with other types of scrap metal processing apparatuses. Such equipment includes a grapple or an electromagnet mounted at the end of a boom on a hydraulic or mechanical crane (Nijkerk: pp. 155-163). The crane can be mobile or it can be stationary, e.g. mounted atop a pedestal located adjacent apparatus 40 in FIG. 1a. One can also deliver scrap metal strip to the open upper end or entrance 54 of vertical chamber 53 with a steel-belted conveyor akin to that employed to deliver obsolete scrap to the upstream end of a shredder (e.g., see Nijkerk, p. 95 and p. 113, FIG. V-11-12 and FIG. V-11 at p. 86). Delivery equipment, similar to that described above in connection with the embodiment of FIG. 1a, may also be employed with the embodiments of the other Figures.

When a conveyor is employed to deliver the scrap metal strip to the apparatus, the strip can be continuously introduced through entrance 54 of chamber 53 at the upstream end of processing path 41. When a grapple or electromagnet is employed to perform the delivery operation, introduction of scrap metal strip through entrance 54 can only be substantially continuous because there will be short periods of time, between successive discharges of scrap from a grapple or electromagnet into the entrance, during which the grapple or electromagnet is being reloaded; and there will be no introduction of scrap metal strip through the entrance during reloading.

Figure 39:
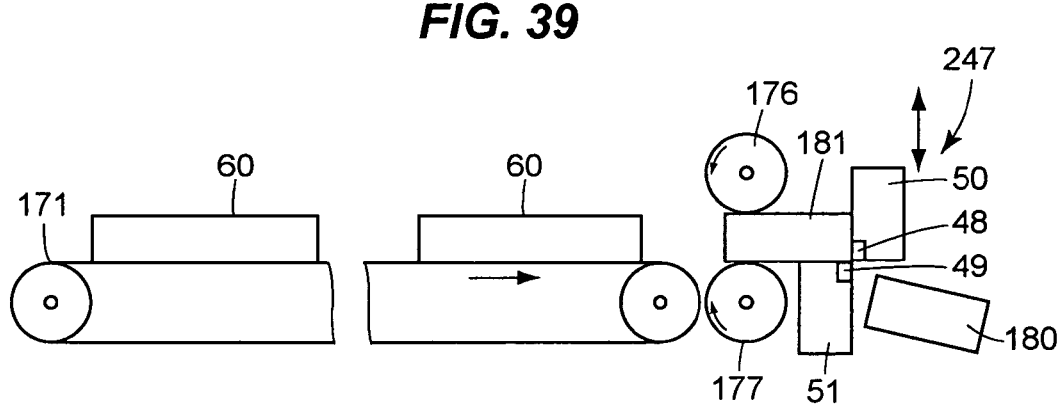
FIG. 39 is a diagrammatic side view illustrating an embodiment employing a second shearing step.

FIG. 1b is a side view showing the thickness of slab 57 and slab portion 60. The length or longest dimension of slab portion 60 is shown in FIG. 22 and corresponds to the width of continuous slab 57. If this dimension is considered to be too large, slab portion 60 can be cut into smaller parts, e.g., cut in half lengthwise, using a conventional, stationary, guillotine shear. One arrangement for doing so is shown in FIG. 39.

A slab portion 60 leaving downstream compression rolls 84, 85 (or leaving third pair of compression rolls 154, 155 (FIG. 22), as the case may be) is directed by appropriate guide elements (not shown) onto a conveyor 171 which transports the slab portion downstream. Conveyor 171 is operated at a speed substantially greater than the speed at which slab portion 60 was moving at the compression rolls preceding conveyor 171. The effect of this speed differential is to cause the slab portions 60, 60, transported on conveyor 171, to be spaced relatively far apart from each other compared to the spacing upstream of conveyor 171.

Conveyor 171 delivers a slab portion 60 to a pair of vertically spaced drive rolls 176, 177 located immediately upstream of stationary guillotine shear 247. Drive rolls 176, 177 are similar to drive rolls 166, 167 described above in connection with the discussion of FIGS. 22, 23. Drive rolls 176, 177 grip slab portion 60 and move the slab portion downstream to a position at which the slab portion can be cut by shear 247. While the slab portion is being cut by shear 247, drive rolls 166, 167 are at rest (not rotating), and they clamp shear portion 60 between them. Active shear blade 48 and its holder 50 move downwardly during the shearing operation (FIG. 39). After a downstream part 180 of slab portion 60 has been severed by the shear, active shear blade 48 and its holder 50 are returned to their upper, retracted positions, and drive rolls 176, 177 are activated to propel the upstream part 181 of slab portion 60 downstream past the location of shear 247. Simultaneously, conveyor 171, which was at rest during the shearing operation, delivers a new slab portion 60 to drive rolls 176, 177, and the sequence of operations described above is repeated.

If upstream part 181 has not cleared shear 247 under the momentum imparted to it by drive rolls 176, 177, it is bumped clear of the shear by a succeeding slab portion 60 as the latter is moved by drive rolls 176, 177 into a position for cutting by shear 247.

One will note from the foregoing description that the method described therein processes scrap metal strip into a plurality of individual packages of uncontained compressed material (the aforementioned slab portion). One will also note that absent from the method described herein is the trimming of excess scrap metal strip before compression or during performance of the method, the need for which is eliminated by the method described herein.

The method and apparatus of the present invention have been discussed above principally in the context of compressing scrap metal strip generated as a by-product of manufacturing operations. However, the invention can also be used on any of the scrap metal materials heretofore processed in commercial scrap baling operations, whether the material be ferrous or non-ferrous or industrial scrap or obsolete scrap, and the term "scrap metal strip" as used herein, encompasses, in its broadest sense, all of these materials.

The foregoing detailed description is a projection; it has been given for clearness of understanding only and no unnecessary limitations should be understood therefrom, as modifications will be obvious to those skilled in the art.

The invention claimed is:

1. The processing of scrap metal strip into a plurality of individual packages of uncontained, compressed material employing a method which includes a compressing step and which eliminates the need to trim excess scrap metal strip before said compressing step or during the performance of said method, said method comprising the steps of:
   providing, as said scrap metal strip, a scrap metal material that has heretofore been processed in commercial baling operations and that constitutes (a) obsolete scrap and (b) industrial scrap resulting from manufacturing operations performed on a coil of metal strip;
   feeding a stream of said scrap metal strip in a downstream direction along a processing path;
   employing a pair of compression rolls to compress said scrap metal strip into a continuous slab of compressed scrap metal strip;
   and employing a guillotine shear to shear said slab into a plurality of slab portions, each composed of compressed scrap metal strip downstream of said shear.

2. A method as recited in claim 1 wherein:
   said processing path has at least a substantial vertical component.

3. A method as recited in claim 2 wherein said path is essentially vertical.

4. A method as recited in claim 1 and comprising:
   providing a second pair of compression rolls, at a location downstream of said shear;
   and employing the second pair of compression rolls to further compress the scrap metal strip in said slab portion, to increase the density of the slab portion.

5. A method as recited in claim 1 and comprising:
   clamping said scrap metal strip upstream of said shear during said shearing step;
   and continuing the feeding of said scrap metal strip after said shearing step without unclamping said strip.

6. A method as recited in claim 5 wherein:
   said method is performed without blocking the path of movement of said slab downstream of the guillotine shear while said slab is being sheared.

7. A method as recited in claim 1 wherein said shear is a traveling shear that travels downstream in synchronous movement with said slab during the shearing of said slab.

8. A method as recited in claim 7 wherein:
   said compressing step produces a continuous slab moving downstream toward said traveling shear under the urging of said compression rolls;
   and said method comprises clamping said scrap metal strip upstream of said shear during the shearing step without interrupting the downstream movement of said slab toward said shear.

9. A method as recited in claim 7 wherein:
   said feeding step comprises moving a continuous stream of scrap metal strip in a downstream direction toward said compression rolls;
   said compressing step produces a continuous slab moving downstream toward said shear under the urging of said compression rolls;
   said compressing step is performed without interrupting the downstream movement of said continuous stream of scrap metal strip toward said compression rolls;
   and said shearing step is performed without interrupting the downstream movement of said slab toward said traveling shear.

10. A method as recited in claim 1 wherein:
    said stream of scrap metal strip is a continuous stream.

11. A method as recited in claim 1 wherein each compression roll has a pair of opposite ends, each end is spaced from and unengaged with an adjacent end on the other roll, and said method comprises:
    containing said scrap metal strip from spilling out at the ends of the compression rolls during said compressing step.

12. A method as recited in claim 1 and comprising:
    providing an additional pair of compression rolls at a location downstream of the first-recited pair of rolls and upstream of said shear;
    and hydraulically loading or spring loading at least one of the rolls in said additional pair of compression rolls to pinch said slab between the rolls.

13. A method as recited in claim 1 and comprising:
    providing containment walls that extend downstream from the upstream end of said path and terminate at said compression rolls;
    and employing said containment walls to contain said steam of scrap metal strip within the processing path, from the upstream end of the processing path to the compression rolls.

14. A method as recited in claim 13 and comprising:
    employing said containment walls to completely enclose said stream of scrap metal strip as the strip moves downstream along the processing path.

15. A method as recited in claim 1 wherein said scrap metal strip is composed of steel and wherein:
    said stream of scrap metal strip is a continuous stream;
    said compressing step produces a continuous slab moving downstream toward said shear under the urging of said compression rolls;
    and said shearing step is performed without interrupting the downstream movement of said slab toward said shear.

16. An apparatus for processing scrap metal material, wherein said apparatus comprises:
    a processing path having upstream and downstream ends, means, adjacent said upstream end, for receiving scrap metal material, a guillotine shear located along said path downstream of said upstream end and comprising means for shearing said scrap metal material, and a pair of rotatable rolls located along said path upstream of said shear and comprising means for engaging said scrap metal material and for urging said scrap metal material downstream along said path toward said shear, and wherein said apparatus is characterized by at least two of the following expedients, (a)-(c), for processing said scrap metal material:

(a) another pair of rotatable rolls, located along said path downstream of said shear, and comprising means for engaging said scrap metal material downstream of said shear;

(b) said shear being a traveling shear which travels downstream in synchronous movement with said scrap metal material during the shearing of said material;

said upstream pair of rotatable rolls comprising means for urging said scrap metal material downstream toward said traveling shear without interruption during said shearing of said material;

and said traveling shear comprises means for shearing the scrap metal material without interrupting the downstream movement of said material along said path;

(c) a pair of pincher rolls located along said path between said upstream pair of rolls and said shear, at least one of said pincher rolls being hydraulically loaded or spring loaded.

17. An apparatus as recited in claim 16 wherein said two expedients are (a) and (b).

18. An apparatus as recited in claim 16 wherein said two expedients are (a) and (c).

19. An apparatus as recited in claim 16 wherein said two expedients are (b) and (c).

20. An apparatus as recited in claim 16 and comprising all three of said expedients, (a)-(c).

21. An apparatus as recited in claim 16 wherein said scrap metal material is compressible, one of said expedients is (a) and wherein:

said pair of rolls located upstream of said shear comprises means for compressing said scrap metal material;

and said pair of rolls located downstream of said shear comprises means for further compressing said scrap metal material to increase the density thereof after said scrap metal material has been sheared.

22. An apparatus as recited in claim 16 wherein:
said processing path has a substantial vertical component.

23. An apparatus as recited in claim 22 wherein:
said processing path is essentially vertical.

24. An apparatus as recited in claim 16 and having a part, including said pair of rolls, that is located upstream of said shear and that comprises:

means for feeding said scrap metal material downstream to said shear;

means for clamping said scrap metal material during shearing;

and means for continuing said feeding, after the material has been sheared, without unclamping the material.

25. An apparatus as recited in claim 24 wherein one of said expedients is (b) and wherein:

said clamping means comprises means for clamping said material during shearing without interrupting the downstream feeding of said material to said shear.

26. An apparatus for processing scrap metal material, wherein said apparatus comprises:

a processing path having upstream and downstream ends, means, adjacent said upstream end, for receiving scrap metal material;

a guillotine shear located along said path downstream of said upstream end and comprising means for shearing said scrap metal material;

a pair of rotatable rolls located along said path upstream of said shear and comprising means for engaging said scrap metal material and for urging said scrap metal material downstream along said path toward said shear;

and another pair of rotatable rolls, located along said path downstream of said shear, and comprising means for engaging said scrap metal material downstream of said shear.

27. An apparatus for processing scrap metal material, wherein said apparatus comprises:

a processing path having upstream and downstream ends;

means, adjacent said upstream end, for receiving scrap metal material;

a guillotine shear located along said path downstream of said upstream end and comprising means for shearing said scrap metal material;

and a pair of rotatable rolls located along said path upstream of said shear and comprising means for engaging said scrap metal material and for urging said scrap metal material downstream along said path toward said shear;

said shear being a traveling shear that travels downstream in synchronous movement with said scrap metal material during the shearing of said material;

said upstream pair of rotatable rolls comprising means for urging said scrap metal material downstream toward said traveling shear without interruption during said shearing of said material;

and said traveling shear comprises means for shearing the scrap metal material without interrupting the downstream movement of said material along said path.

28. An apparatus for processing scrap metal material, wherein said apparatus comprises:

a processing path having upstream and downstream ends;

means, adjacent said upstream end, for receiving scrap metal material;

a guillotine shear located along said path downstream of said upstream end and comprising means for shearing said scrap metal material;

and a pair of rotatable rolls located along said path upstream of said shear and comprising means for engaging said scrap metal material and for urging said scrap metal material downstream along said path toward said shear;

said apparatus having a part, including said pair of rolls, that is located upstream of said shear and that comprises:

means for feeding said scrap metal material downstream to said shear;

means for clamping said scrap metal material during shearing;

and means for continuing said feeding, after the material has been sheared, without unclamping the material.

29. An apparatus as recited in claim 28 wherein:
said clamping means comprises means for clamping said material during shearing without interrupting the downstream feeding of said material to said shear.

30. An apparatus as recited in claim 28 wherein:
said apparatus is devoid of any provision for blocking the path of movement of said scrap metal material downstream of the guillotine shear while said material is being sheared.

31. A method for processing scrap metal material, said method comprising the steps of:
providing a processing path having upstream and downstream ends;
providing a guillotine shear between said upstream and downstream ends;
receiving scrap metal material at said upstream end;
feeding said scrap metal material downstream along said path to said shear;
shearing said material at said shear;
clamping the material at a location upstream of said shear during said shearing step; and
continuing said feeding step without unclamping said material.

32. A method as recited in claim 31 wherein:
said method is performed without blocking the path of movement of said scrap metal material downstream of the guillotine shear while said material is being sheared.

* * * * *